United States Patent
Besada Portas et al.

(10) Patent No.: US 9,852,640 B2
(45) Date of Patent: Dec. 26, 2017

(54) METHOD FOR CREATING AND CHOOSING A DETERMINATE PILOTING STRATEGY FOR AN AIRCRAFT

(71) Applicant: The Boeing Company, Chicago, IL (US)

(72) Inventors: Juan Alberto Besada Portas, Madrid (ES); Javier Lopez Leones, Madrid (ES); Guillermo Frontera, Madrid (ES)

(73) Assignee: THE BOEING COMPANY, Chicago, IL (US)

( * ) Notice: Subject to any disclaimer, the term of this patent is extended or adjusted under 35 U.S.C. 154(b) by 292 days.

(21) Appl. No.: 14/835,114

(22) Filed: Aug. 25, 2015

(65) Prior Publication Data
US 2016/0104382 A1 Apr. 14, 2016

(30) Foreign Application Priority Data
Oct. 14, 2014 (EP) .................................... 14382391

(51) Int. Cl.
*G08G 5/00* (2006.01)
*B64C 19/00* (2006.01)
*G08G 5/02* (2006.01)
*G05D 1/10* (2006.01)

(52) U.S. Cl.
CPC ........... *G08G 5/0039* (2013.01); *B64C 19/00* (2013.01); *G05D 1/101* (2013.01); *G08G 5/0052* (2013.01); *G08G 5/0095* (2013.01); *G08G 5/025* (2013.01)

(58) Field of Classification Search
None
See application file for complete search history.

(56) References Cited

U.S. PATENT DOCUMENTS

| 6,163,744 A | 12/2000 | Onken et al. |
| 2010/0162255 A1 | 6/2010 | Guilley et al. |
| 2013/0317672 A1 | 11/2013 | Magana Casado et al. |

OTHER PUBLICATIONS

Juan A. Besada et al, Automated Aircraft Trajectory Prediction Based on Formal Intent-Related Language Processing, Sep. 2013, vol. 14. No. 3, pp. 1067-1081.
European Patent Office; European Search Report for Application No. EP14382391 dated Apr. 15, 2015.

*Primary Examiner* — Mussa A Shaawat
*Assistant Examiner* — Kyung Kim
(74) *Attorney, Agent, or Firm* — Parsons Behle & Latimer

(57) ABSTRACT

A method includes generating an initial flight context that includes a set of unresolved flight constraints. The method further includes generating a decision tree based on the initial flight context. The decision tree includes a plurality of flight contexts corresponding to leaves of the decision tree. The method also includes expanding the decision tree according to a greedy best-first strategy that selects a flight context of the decision tree for expansion based on a fitness value assigned to the flight context. The method includes selecting, as a piloting strategy, a flight context of the decision tree that includes a sequence of actions to resolve each of the unresolved flight constraints. The method further includes flying an aircraft according to the piloting strategy.

20 Claims, 18 Drawing Sheets

1: | HOLD | DESCEND TO 3000 ft | FITNESS: 1

$d_1$

2: | DESCEND TO 3000 ft | FITNESS: 0,8

3: | HOLD | DECELERATE TO 250 kt | FITNESS: 0,9

$d_1$

3: | DECELERATE TO 250 kt | FITNESS: 0,7

8: | HOLD | DESCEND TO 3000 ft | DECELERATE TO 250 kt | DESCEND TO 1000 ft |    FITNESS: 2,7
                                                    $d_1$

9: | HOLD | DESCEND TO 3000 ft | DECELERATE TO 250 kt | HOLD | DESCEND TO 1000 ft |    FITNESS: 2,9
                                                    $d_1$                    $d_3$

METHOD FOR CREATING AND CHOOSING A DETERMINATE PILOTING STRATEGY FOR AN AIRCRAFT

CROSS-REFERENCE TO RELATED APPLICATIONS

This application, under 35 U.S.C. §119, claims the benefit of E.P. Application No. 14382391.2 filed on Oct. 14, 2014, and entitled "Method for creating and choosing a determinate piloting strategy for an aircraft," the contents of which are hereby incorporated by reference in its entirety.

FIELD OF THE DISCLOSURE

The present disclosure relates to a method for creating and choosing a determinate piloting strategy for an aircraft, which may be suitable for complying with some imposed flight restrictions and with some optimization criteria.

The method is applicable in the field of Aeronautic Engineering and, more particularly, in the field of Electronics and Automatic Regulation for Avionics.

BACKGROUND

One of the crucial steps of planning and optimizing a trajectory for any air vehicle (e.g., commercial or military aircraft, missile, helicopter or unmanned air-vehicle) is the construction of a sequence of actions that addresses all the constraints of the flight coming from the specific air vehicle mission in an optimum and flyable way.

In Air Traffic Management (ATM), there may be many different constraints to the trajectory that an aircraft must follow, constraints that may relate to given waypoints along which the aircraft must pass during the flight, or to certain speeds or altitudes to which the aircraft must restrict when passing along certain areas.

Therefore, the aforementioned sequence of actions may establish what maneuvers (along with the specific order within they should come into effect) the aircraft should perform in order to meet the requirements set out by the given constraints.

As has already been said, constraints usually refer to requirements such as geographical positions, speeds or altitudes that the aircraft must comply with during the flight. Constraints do not normally precisely define what low level actions (i.e. flaps position, landing gear position, speed brake position, etc.) the aircraft must perform in order to meet the requirements; the latter is left to the arbitrariness of the pilot or Flight Management System (FMS), as long as the final trajectory followed by the aircraft satisfies the given constraints.

Thus, in order to meet the constraints, sequences of actions to be performed by the aircraft are defined according to a specific schedule. This specific schedule according to which actions to meet the flight constraints are defined and listed in a sequence of actions are called "micro-strategies".

In a first instance, a horizontal profile (also called lateral profile) for the flight is defined. This profile establishes the horizontal path to be followed by the aircraft so that it passes along the coordinates or waypoints that the operator (e.g., airline) has established for the specific flight. Accordingly, the horizontal profile establishes the actions (for the case of a Horizontal Profile defined geographically, these actions may refer either to turning maneuvers (geodesic or circular arcs), constant bank angle turns, constant heading segments, etc.) to be performed by the aircraft in the different flight segments (FS) in which the entire flight is divided. Each flight segment (FS) is defined (again for the case of a Horizontal Profile defined geographically) by two along-track distances.

In general, a Flight Segment is defined by two triggers, which represent respectively an initial and a final state of the aircraft, between which an action should be performed by said aircraft in order to conform to a certain flight constraint imposed for that Flight Segment.

For example, a constraint may indicate that the aircraft should decrease its altitude in 10,000 feet when flying from waypoint A to waypoint B (trigger A and trigger B, defining a Flight Segment of a geographical Horizontal Profile). Thus, the aircraft should perform an action for fulfilling the condition imposed by that constraint.

In a second instance, a vertical profile (also called longitudinal profile) for the flight is defined. This profile establishes the ascent and descent maneuvers, along with the acceleration and deceleration maneuvers to be performed by the aircraft, in order to meet the altitude and speed constraints.

The output of the vertical profile definition process is a sequence of ascent-descent maneuvers, acceleration-deceleration maneuvers or their combination (alternated with steady-state periods) to be accomplished by the aircraft, each maneuver being specified by an initial and final trigger within which the maneuver should take place.

Finally, in a third instance, a configuration profile for the flight is defined. This profile establishes a sequence of "low level" actions (actions defined in more detail) to be executed by the aircraft so that the aircraft flight complies with the restrictions imposed by the given constraints; these "low level" actions refer to the extensions and retractions of either the landing gear, speed brakes or high lift devices, so that the aircraft can accomplish the actions previously defined in the Horizontal and Vertical Profile without violating certain performance limitations (typically, minimum or maximum speeds).

The output of the configuration profile generation process is a sequence of extension-retraction maneuvers (alternated with steady-state periods) to be executed by the aircraft, each maneuver being specified by an initial and final trigger within which the maneuver should take place.

The configuration profile is defined in accordance with the maneuvers which are previously defined in both the horizontal profile and the vertical profile.

The construction of the abovementioned sequences of actions is a complex task, since there are different kinds of constraints that cannot be addressed independently, as they are interrelated and the process should ensure compliance with the air vehicle performance characteristics.

SUMMARY

In an embodiment, a method includes generating a set of flight contexts including at least an initial flight context. Each flight context of the set of flight contexts includes a fitness value. The method further includes repeatedly performing operations. The operations include selecting a flight context that has a highest fitness value from the set of flight contexts. The operations also include expanding the selected flight context to obtain at least one expanded flight context. The operations further include allocating a new fitness value to the at least one expanded flight context. The operations include adding the at least one expanded flight context to the set of flight contexts. The method further includes after repeatedly performing the operations, selecting, from the set of flight contexts, the flight context that has the highest fitness value as a piloting strategy for flying an aircraft. The method includes flying the aircraft according to the piloting strategy.

Each flight context of the set of flight contexts may further include a set of resolved flight constraints, a set of unresolved flight constraints, a sequence of actions to be performed by the aircraft in order to comply with at least one flight constraint, or a combination thereof. The set of resolved flight constraints may include a set of resolved altitude flight constraints, a set of resolved speed flight constraints, or both. The set of unresolved flight constraints may include a set of unresolved altitude flight constraints, a set of unresolved speed flight constraints, or both. The flight constraints may be expressed in a flight intent description language (FIDL) comprising lexemes that univocally express a way of piloting the aircraft and univocally lead to a determinate aircraft trajectory when all configurable parameters involved in the FIDL lexemes are determined.

The configurable parameters may include a range of numerical values of certain air vehicle state variables. The configurable parameters may further include a set of discrete values for defining the reference for the numerical value of the aircraft state variables. The configurable parameters may also include a set of discrete values for defining different air vehicle settings.

Further, each action of the sequence of actions may be expressed in an intent composite description language (ICDL) comprising lexemes or intent composites that univocally express a way of piloting the aircraft and univocally lead to a determinate aircraft trajectory when all configurable parameters involved in the ICDL lexemes are determined. The method may also include translating the sequence of actions from the ICDL into an aircraft intent description language (AIDL) that is a low level description language that univocally defines a precise way of commanding configurable parameters of the aircraft, yielding to a determinate aircraft trajectory. The method may further include leaving at least one configurable parameter of at least one of the actions of the sequence of actions as undefined or expressed as a range of selectable values to enable tuning according to a user preference.

Expanding the selected flight context may include selecting an action that addresses at least one flight constraint, selected from a set of unresolved flight constraints of the selected flight context. Expanding the selected flight context may further include adding the selected action to a sequence of actions to be performed by the aircraft. Expanding the selected flight context may also include removing the at least one flight constraint from the set of unresolved flight constraints. Expanding the selected flight context may include adding the at least one flight constraint to a set of resolved flight constraints of the selected flight context.

The piloting strategy may be selected from a subset of the set of flight contexts. Each flight context of the subset may have an empty set of unresolved flight contexts.

The repeated operations may further include computing a partial trajectory corresponding to at least one action of a sequence of actions associated with the selected flight context. An amount of time devoted to expanding the selected context and to computing the partial trajectory may be configurable to enable compromise between computing time and optimality of the piloting strategy. The piloting strategy may be selected from a subset of the set of flight contexts. For each flight context of the subset, the partial trajectory may correspond to each action of the sequence of actions and is feasible. The partial trajectory may be feasible when the partial trajectory is flyable and the partial trajectory meets all the resolved constraints. The partial trajectory may be flyable if it is compatible with an aircraft performance model of the aircraft.

The new fitness value may be proportional to a number of resolved flight constraints of the at least one expanded flight context, proportional to an inverse of the number of resolved flight constraints of the at least one expanded flight context, proportional to the number of unresolved flight constraints of the at least one expanded flight context, proportional to the of the number of unresolved flight constraints of the at least one expanded flight context, equal to the sum of an estimated cost of a computed partial trajectory corresponding to the at least one expanded flight context and an estimated cost of an estimated remaining trajectory, or any combination thereof.

In an embodiment, a method includes generating an initial flight context. The method further includes adding the initial flight context to a set of flight contexts stored at a context database. The method also includes selecting a flight context that has a highest fitness value from the set of flight contexts. The selected flight context includes a set of unresolved constraints, a set of resolved constraints, and a sequence of actions. The method includes computing a partial trajectory for all the actions of the sequence of actions when the partial trajectory can be computed. The method further includes determining whether the partial trajectory is feasible when the partial trajectory is computed. The method also includes determining whether the set of unresolved constraints is empty when the partial trajectory is feasible. The method includes yielding a piloting strategy corresponding to the selected flight context when the set of unresolved constraints is empty. Otherwise, when the set of unresolved constraints is not empty, the method includes expanding the selected flight context to form at least one expanded flight context. Further, when the set of unresolved flight constraints is not empty, the method includes adding the one or more expanded flight contexts to the set of flight contexts. Also, when the set of unresolved flight constraints is not empty, the method includes selecting again the flight context that has the highest fitness value from the set of flight contexts.

The method may further include, when the partial trajectory cannot be computed, determining whether the set of unresolved constraints is empty. The method may also include, when the partial trajectory is not feasible, discarding the selected flight context from the set of flight contexts. The method may include, when the partial trajectory is not feasible, yielding no solution when the set of flight contexts is empty. Otherwise, when the set of flight contexts is not empty, the method may include selecting again the flight context that has the highest fitness value from the set of flight contexts.

In an embodiment, a method includes generating an initial flight context that includes a set of unresolved constraints. The method further includes generating a decision tree based on the initial flight context. The decision tree includes a plurality of flight contexts as leaves. The method also includes expanding the decision tree according to a greedy best-first strategy that selects a flight context of the decision tree for expansion based on a fitness value assigned to the flight context. The method includes selecting, as a piloting strategy, a flight context of the decision tree that includes a sequence of actions to resolve each of the unresolved constraints. The method further includes flying an aircraft according to the piloting strategy.

The method may also include computing a partial trajectory corresponding to the selected flight context. The fitness value may be based on at least one measure of the partial trajectory. The measure may include consumed fuel, elapsed time, average velocity, or a combination thereof.

Figure 1:
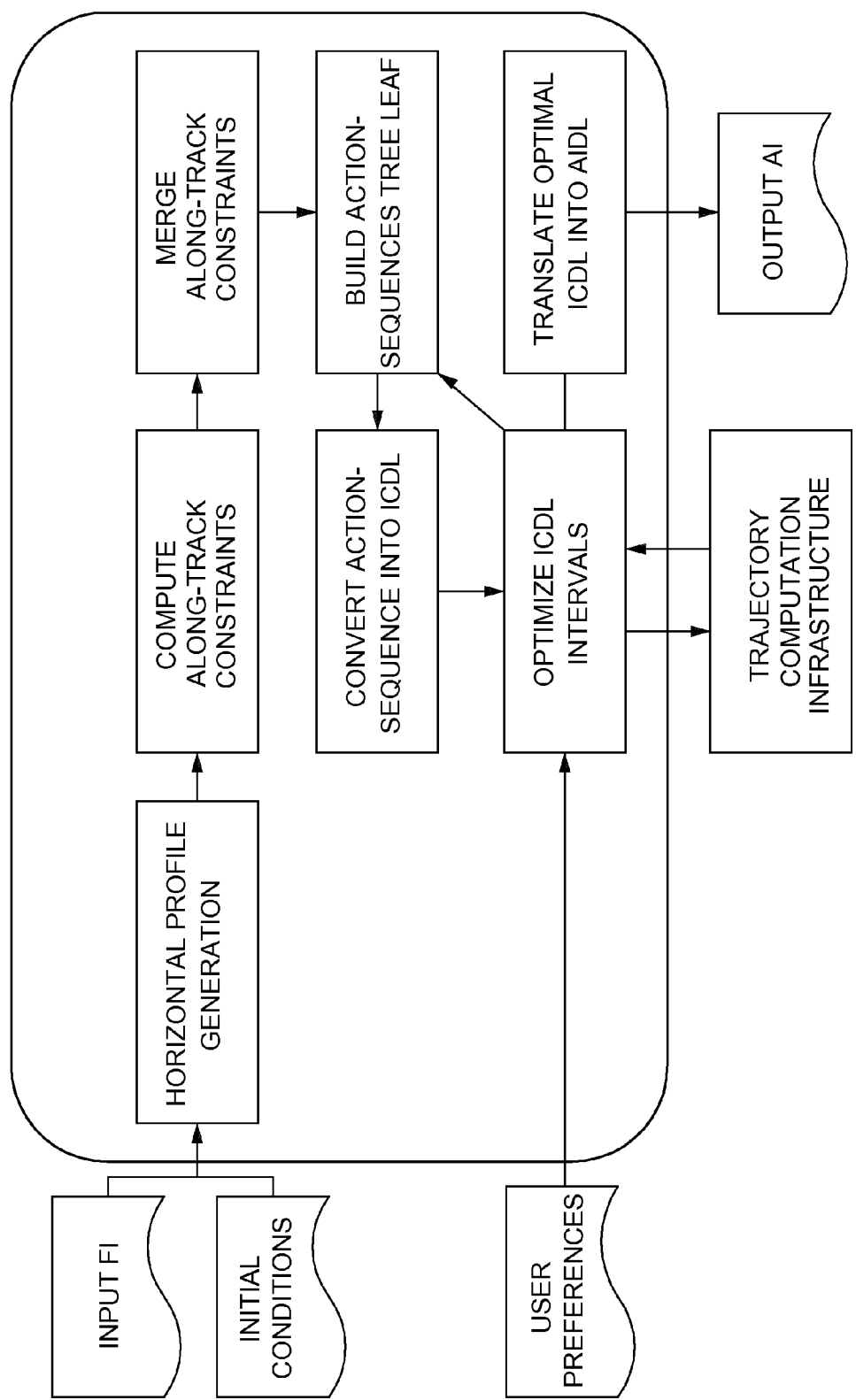
FIG. 1 shows a schematic diagram of the different phases involved in the Intent Generation Core Process.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the disclosure as defined by the appended claims.

DETAILED DESCRIPTION

In order to define the horizontal, vertical and configuration profiles, the disclosed method makes use of three different types of Description Languages which have been created in order to univocally define and govern aircraft movement. These languages are respectively called: Flight Intent Description Language (FIDL), Intent Composite Description Language (ICDL) and Aircraft Intent Description Language (AIDL).

The aforementioned Description Languages for aircraft movement are respectively high level, medium level and low level Description Languages, i.e. they gradually tend to define more precisely how the aircraft must be governed in order to comply with the restrictions imposed by the constraints.

Therefore, the input of a trajectory generation process may be given in FIDL language, which defines the constraints that must be observed by the aircraft during its flight, while the output of a trajectory generation process may be yielded in AIDL language, which defines the actions (intents) to be executed by the aircraft in order to fly a trajectory that complies with the given constraints.

Intent Composite Description Language (ICDL) is the Description Language in which the outputs of every profile generation process within the Trajectory Generation Process may be expressed. ICDL is constituted by expressions which in turn are formed by "words" coming from the low level AIDL language.

These "words" of the AIDL language express individual actions executed by the aircraft while ICDL "expressions" (formed by AIDL "words") express instructions which may be combinations of individual actions that lead to aircrafts' maneuvers intended to comply with aircraft's movement restrictions set out by the given constraints.

More thorough explanations of the mentioned Description Languages used by the present invention can be found in the following documents:

Formal Intent-Based Trajectory Description Languages, Guillermo Frontera, Juan A. Besada, Ana M. Bernardos, Enrique Casado, and Javier López-Leonés. IEEE Transactions on Intelligent Transportation Systems. 2014 IEEE.

Automated Aircraft Trajectory Prediction Based on Formal Intent-Related Language Processing, Juan A. Besada, Guillermo Frontera, Jesús Crespo, Enrique Casado, and Javier López-Leonés. IEEE Transactions on Intelligent Transportation Systems. VOL. 14, No. 3. September 2013.

Additionally, examples of the implementation of Trajectory Generation Processes for assisting the prediction and generation of aircrafts' trajectories based on the mentioned Description Languages can be found in European Patent applications EP 07380259, EP 11382020, EP 12382196 and EP 12382195.

The present disclosure details a process that, making use of the mentioned Intent Composite Description Language (ICDL), enables an automation infrastructure (be it either ground-based or air-based) searching for a combination of piloting strategies that comply with the flight restrictions given by a source, such as the Air Traffic Controllers (ATCO), airline, aircraft operator or the Operational context, whilst optimizing the results according to certain "optimization criteria" and user preferences.

The mentioned optimization criteria and user preferences may refer to Aircraft Performance features, or maybe to some pre-determined operator strategies, which may instruct to accomplish a certain goal (for example, in terms of fuel cost saving) either in all or part of its flights. These optimization criteria and user preferences may be introduced as an input into the Trajectory Generation Process.

The present disclosure details a process which may be in charge of building a decision tree with all the possible combinations (or a subset of all the possible combinations) of piloting strategies that would solve a given set of constraints on the air vehicle trajectory. This tree can be both built and gone over according to certain "optimization instructions". The process detailed in the present disclosure yields then as its output a unique set of piloting strategies that univocally generates a trajectory complying with the flight constraints and the optimization criteria and user preferences.

The "optimization instructions" according to which the tree of piloting strategies can be both built and gone over, may be selected among many possible conventional strategies.

These kinds of strategies are known in the literature as "search strategies". Examples of such are breadth-first search, uniform-cost search, depth-first search, bidirectional search, greedy best-first search, A* (which reads A-star) search, etc.

The search strategy used in the preferred embodiment of the invention, may fall into the category of greedy best-first search, as the order in which action sequences are explored may be decided based on heuristics. Due to the nature of the heuristic function (which is the sum of the weights of all the micro-strategies used), the search strategy may behave much like a depth-first search.

An "in-depth" strategy may consist of allocating a certain punctuation value to each of the piloting strategies, and finally choosing as the output of the process the piloting strategy whose punctuation may be the highest.

There may be many different criteria for building up a function (namely a fitness function) which allocates a punctuation value for the piloting strategies.

The fitness function f(X) can be either based on the actual cost/value function g(X) (nomenclature depends on whether it is to be minimized/maximized), a heuristic function h(X), or both. In uniform-cost search, f(X)=g(X); in greedy best-first search f(X)=h(X); and in A* search f(X)=g(X)+h(X).

The mentioned "in-depth" strategy for building and going over the decision tree may be based on a purely-heuristic criterion, and its use as an optimization instruction for building and going over the decision tree may render a good trade-off between efficiency and optimality of the computation. According to the "in-depth" strategy, the generated partial trajectories which have been allocated the highest punctuation in each step of the process may be further developed, until a branch of the tree finishes with a unique optimal trajectory complying with all the specifications. Therefore, in the preferred embodiment of the method, the process may not build up the whole tree comprising all the possible piloting strategies, afterwards choosing among them which strategy would be the best, rather it may build up the tree while making decisions, therefore saving computation time.

The piloting strategies constituting the leaves of the decision tree may be expressed using composites (i.e. ICDL lexemes), hence a solution may be given as an ICDL sentence. The action sequence (or its equivalent ICDL sentence) may describe a series of maneuvers to be performed by the air-vehicle so all the constraints are met in their respective domains of application (DoA).

The domain of application (DoA) of a constraint may be the boundary to which the constraint must be restricted, that is, the limits within which the constraint should effect: for example, a given constraint may refer to the altitude at which the aircraft must fly, between two determined waypoints along the flight track. Then, the domain of application of that altitude constraint would be the along track distance defined by two waypoints, in which the altitude restriction is in force.

The process detailed in the present disclosure has been designed so it can fit different needs with minimal changes. As an example, some users may want the output to be optimal in terms of fuel consumption, while others may want to mimic piloting behaviors executed by specific avionics systems (e.g., model different flight management system equipment in a simulation environment to assess their performances). It is also possible to alter the compromise between optimality and computation time, so it suits both on-line and off-line computations. For instance, a minimum flight cost criteria could be used to search the tree, which may imply cover more leaves of the tree looking for the optimal solution.

The ICDL instance resulting from this process can be further optimized (some action intervals which could have been left open might be further determined) and translated into AIDL as part of a Modular Intent Generation Infrastructure (MIGI) process, to generate a trajectory, or to serve as guidance reference for an air-vehicle control system.

The process detailed in the present disclosure poses an important innovation in the field of trajectory generation processes, since the already existing solutions may be limited to one specific type of air-vehicle (commercial aircraft, military aircraft, rotorcrafts or UAV's) and to common ways of operating said specific air-vehicle. The output of these processes is a trajectory, and not an ICDL sentence or any equivalent means of defining how the aircraft is to be operated.

Examples of these existing methods can be found in the following references:

Experimental Flight Management System. Prediction of optimal 4D Trajectories in the presence of Time and Altitude Constraints, EUROCONTROL, Doc. 97-70-09, 1997;

Vertical Profile optimization for the Flight Management System CMA-9000 using the golden section search method, Patron, R. S. F.; Botez, R. M.; Labour, D. IECON 2012—38th Annual Conference on IEEE Industrial Electronics Society, pp. 5482-5488, 25-28 Oct. 2012;

A 4-D trajectory optimization and guidance technique for terminal area traffic management, Visser, H. G. Internal Report LR-769, Delft University of Technology, 1994;

Considerations in the application of dynamic programming to optimal aircraft trajectory generation, Waller, M. C.; Rigopoulos, J. G.; Blackman, D. R.; Berreen, T. F. Aerospace and Electronics Conference, 1990. NAECON 1990. Proceedings of the IEEE 1990 National, pp. 574-579 vol. 2, 21-25 May 1990.

The already existing methods use several techniques, such as nonlinear programming, dynamic programming, evolutionary algorithms (genetic algorithms, ant colony, etc.) or expert systems based on flight-phase-dependent rules.

However, a problem with the conventional processes of generating the guidance reference and generating the trajectory, is that these processes are conventionally coupled, therefore being very difficult to extract for other uses (e.g. optimization, exchange, synchronization).

None of the existing methods is able to benefit from the ICDL language. Furthermore, as has been said, the existing methods usually provide a three- or four-dimensional trajectory as an output.

Another problem with the existing methods, is that these methods aim for a particular context: real-time or off-line trajectory prediction, UAV or commercial aircraft trajectory prediction, etc., but none of them is capable of solving trajectory prediction problems regardless of the air-vehicle type, in a general case with application and extension to any type of air vehicle.

The reason behind the wide application of this method is the mathematical foundation of the formal languages it uses. This method is based on the mathematics behind flight dynamics (used in the creation of the formal languages to describe intent information) and decision making (used to build the decision tree and search for optimality).

A further problem is that the output of conventional processes is a trajectory and not an ICDL sentence or any equivalent means of defining how the aircraft is to be operated. None of the existing methods provides the capability of having in hand all the possible solutions for a specific constrained flight. This allows the search for sub-optimal trajectories (for instance in a conflicting scenario where suboptimal conflict free trajectories are desired).

A group of constraints applied to a trajectory in the presence of a set of possible behaviors to attain each type of constraint gives rise to the strategy tree, which can be built accordingly to the search algorithm, but could also be built expanding other nodes, so generating other possible solutions, which in general would be suboptimals.

Advantageously, the method detailed in the present disclosure allows any Trajectory Prediction process to have the entire possible strategy solution map for a given set of constraints for an air-vehicle trajectory and specific configuration (i.e., number of micro-strategies available, number of composites available).

Another advantage is that the method described does not rely on the type of air-vehicle. The method can be adapted to any air-vehicle just checking the suitability of the micro-strategies and modifying them or adding new ones if needed.

The process is highly customizable and extensible. This is particularly interesting when trying new experimental piloting strategies/guidance references (e.g. experimental FMS's, military aircrafts, etc.).

Certain micro-strategies have been created to fulfill very generic flying vehicle behaviors (accelerate, descent, ascent, etc), whilst others are more specific to a fixed air-vehicle, or even a commercial aircraft (Mach-CAS descent, retract/extend landing gear). If the method is to be applied to another air-vehicle, for instance a helicopter, some of these micro-strategies can be removed or disregarded (or heavily penalized so they aren't used) and new ones can be added (for example the hovering capability of a helicopter, which does not have sense as a piloting strategy when considering a fixed wing air-vehicle).

The use of composites from ICDL allows this process to inherit all the benefits of the ecosystem of tools and applications around trajectory description languages (AIDL, FIDL, and ICDL). The advantage of using these languages is the availability of information on how the aircraft is going to be flown, instead of the trajectory that the aircraft must follow. While it is relatively easy to obtain an aircraft trajectory from ICDL, it is much more difficult to extract an ICDL from an aircraft trajectory. Another advantage of working with trajectory intent languages is that it allows sharing flight information using much less bandwidth, since they encode the minimum necessary information to regenerate a trajectory by any trajectory prediction infrastructure.

The present disclosure presents a method for creating and choosing a determinate piloting strategy for an aircraft.

The method presented generally comprises:
a. generating an initial Flight context;
b. expanding the initial Flight context, thereby obtaining at least one expanded flight context;
c. putting the initial Flight context and the at least one expanded flight context into a list of Flight contexts;
d. select, from the list of Flight contexts, the flight context which is allocated a highest fitness value, and repeat the process described in steps "b" and "c" taking the selected Flight context as the initial flight context.

The method ends by choosing a preferred piloting strategy for flying the aircraft. The chosen preferred piloting strategy refers to that context, from the list of Flight contexts, whose allocated fitness value is the highest of all the expanded contexts.

A flight context may generally comprise at least two of the following:
i. a list of unresolved altitude flight constraints;
ii. a list of unresolved speed flight constraints;
iii. a list of resolved altitude flight constraints;
iv. a list of resolved speed flight constraints;
v. a sequence of actions to be performed by an aircraft in order to comply with the constraints from the lists of flight constraints;
vi. a fitness value of the context.

Furthermore expanding a flight context may generally involve at least one of the following:
i. choosing an action that addresses at least one unresolved constraint selected from the lists of unresolved altitude and/or speed flight constraints;
ii. adding the chosen action to the sequence of actions to be performed by the aircraft;
iii. moving the selected unresolved flight constraint addressed by the chosen action, from the list of unresolved flight constraints to the list of resolved flight constraints;
iv. allocating a fitness value to the context;

According to a preferred embodiment of the method, the preferred piloting strategy for flying the aircraft may also be the flight context, from the list of flight contexts, whose lists of unresolved altitude and/or speed flight constraints are empty, that is, the context whose associated actions from the sequence of actions address all the constraints of the flight.

According to one embodiment of the method, the method comprises computing a partial trajectory corresponding to at least one of the actions of the sequence of actions associated to the context selected from the list of flight contexts.

According to what has been explained in the previous paragraph, the method may end by choosing a preferred piloting strategy for flying an aircraft as that context, taken from the list of flight contexts, which in addition to the conditions described above, also fulfills the condition that its associated computed partial trajectory, corresponding to each and every of the actions of the sequence of actions, is considered feasible.

A computed partial trajectory is considered feasible if it fulfills the following conditions:
- the computed partial trajectory is flyable, wherein a partial trajectory is considered flyable if it is compatible with Aircraft Performance Model, APM, of an aircraft for which the present method is being applied;
- the computed partial trajectory meets all the resolved constraints.

As mentioned previously, a fitness value may be allocated to every flight context. This fitness value may be allocated according to any combination of the following criteria:
- the fitness value of a flight context is proportional to the number of resolved constraints of that flight context;
- the fitness value of a flight context is proportional to the inverse of the number of resolved constraints of that flight context;
- the fitness value of a flight context is proportional to the number of unresolved constraints of that flight context;
- the fitness value of a flight context is proportional to the inverse of the number of unresolved constraints of that flight context;
- the fitness value of a flight context is equal to the sum of an estimated cost of the computed partial trajectory corresponding to that flight context and an estimated cost of an estimated trajectory until flight ends.

According to a preferred embodiment of the method, flight constraints may be expressed in a description language called Flight Intent Description Language, FIDL.

FIDL description language may include lexemes which univocally express a way of piloting the aircraft which univocally leads to a determinate aircraft trajectory, given that all configurable parameters involved in the FIDL lexemes are determined.

Also in a preferred embodiment of the method, actions from the sequence of actions may be expressed in a description language called Intent Composite Description Language, ICDL.

ICDL description language may include lexemes or "Intent Composites" (IC). These Intent Composites univocally express a way of piloting the aircraft which univocally leads to a determinate aircraft trajectory, given that all configurable parameters involved in the ICDL lexemes are determined.

Accordingly, the preferred embodiment of the method may include translating the Intent Composites from ICDL description language to a description language called Aircraft Intent Description Language, AIDL.

AIDL description language may be a low level description language which univocally defines a precise way of commanding all configurable parameters of the aircraft, yielding to a determinate aircraft trajectory.

The amount of time which the method devotes to expand the contexts and compute the partial trajectories of the contexts may be configurable, thereby enabling a compromise between computation time and optimality of the chosen piloting strategy.

For example, if a feasible trajectory has been found, and yet an optimal trajectory (a better trajectory than the one which has already been found) was likely to be found by devoting more computation time, the method may not continue searching the optimal trajectory if it involves too much computation time, and the sub-optimal trajectory may be found to be a good solution.

According to one embodiment of the method, some of the configurable parameters of the actions from the sequence of actions may be left undefined or expressed as a range of allowable values, for they can be tuned according to some user preferences given as an input to the method at any time.

The mentioned configurable parameters of the aircraft may be any combination of the following:
- a range of numerical values of certain air vehicle state variables;
- a list of discrete values for defining the reference for the numerical value of the aircraft state variables;
- a list of discrete values for defining different air vehicles settings: engine ratings, configuration settings (e.g., flaps/slats positions or trim positions).

According to what has been described, the following is a description of the steps of one embodiment of the method for creating and choosing a determinate aircraft piloting strategy.

These steps may include:
a. generating an initial flight context;
b. adding the initial flight context to a context database (list of flight contexts);
c. selecting, among the contexts of the context database, the context which is allocated the highest fitness value, whereby if there are no contexts in the contexts database, the method finishes yielding none piloting strategy;
d. computing a partial trajectory for all the actions of the sequence of actions of the selected context;
e. determining whether the computed partial trajectory is feasible, whereby if the partial trajectory is not feasible, the selected context is discarded and the method returns to step "c";
f. determining whether the lists of unresolved flight constraints of the selected context are empty, whereby if the lists of unresolved flight constraints of the selected context are empty, the method finishes yielding as a result a piloting strategy corresponding to the selected flight context;
g. expanding the selected context, which involves:
   selecting at least one possible action that addresses at least one unresolved flight constraint;
   adding the selected action to the action sequence of the context;
   moving the at least one unresolved constraint addressed by the selected action, from the list of unresolved constraints to the list of resolved constraints;
   allocating a new fitness value to the expanded context;
h. adding the expanded flight context to the context database;
i. returning to step "c".

DESCRIPTION OF AN EXEMPLARY EMBODIMENT

The following is a description of an embodiment of the invention making reference to the Figures.

The present disclosure, as has already been introduced, describes a method for creating and choosing a determinate aircraft piloting strategy.

Figure 3:
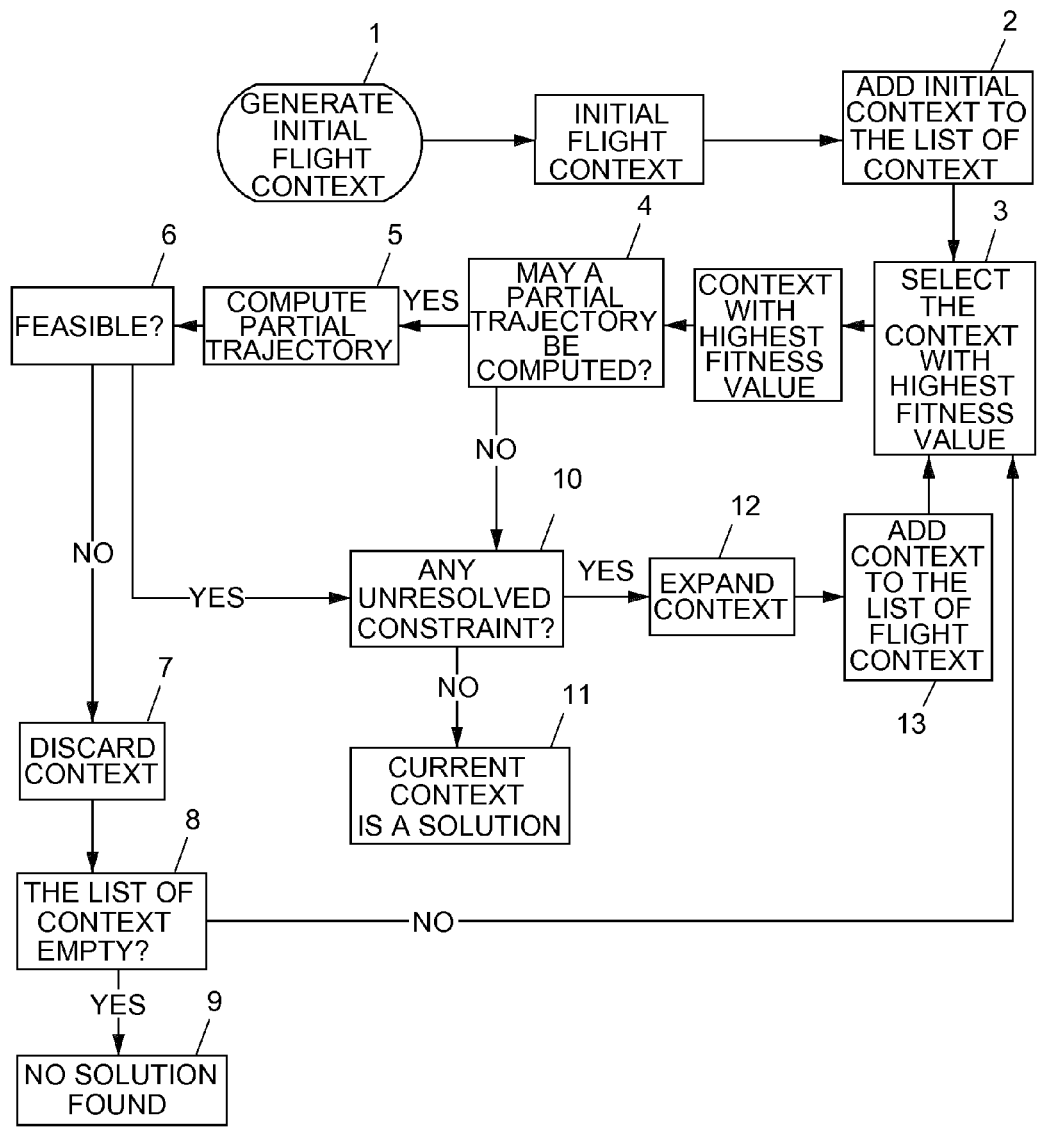
FIG. 3 shows a flow chart describing all the different phases within the method of the disclosure.

The steps comprising an embodiment of the method of the present disclosure are schematically depicted in FIG. 3.

The method relates to the Intent Generation Process of the aircraft, which in turn comprises the Horizontal (or lateral) Profile Generation Process, the Vertical (or longitudinal) Profile Generation Process and to the Configuration Profile Generation Process. Each of these profile generation processes may be respectively performed one after the other.

An embodiment of the Intent Generation Process of the aircraft, which is schematically depicted in FIG. 1, may be in charge of determining the aircrafts intents (expressed in AIDL description language) necessary for the aircraft to conform to certain Flight constraints and user preferences.

Hence, this Intent Generation Process may be the core of the Trajectory Generation/Prediction Process, when making use of the aforementioned Intent Description Languages for aircraft trajectories (FIDL, ICDL, and AIDL).

The Intent Generation Process first may include acquiring some input about the flight constraints to be imposed in the trajectory computation process, along with some optimization criteria and/or user preferences.

Figure 5:
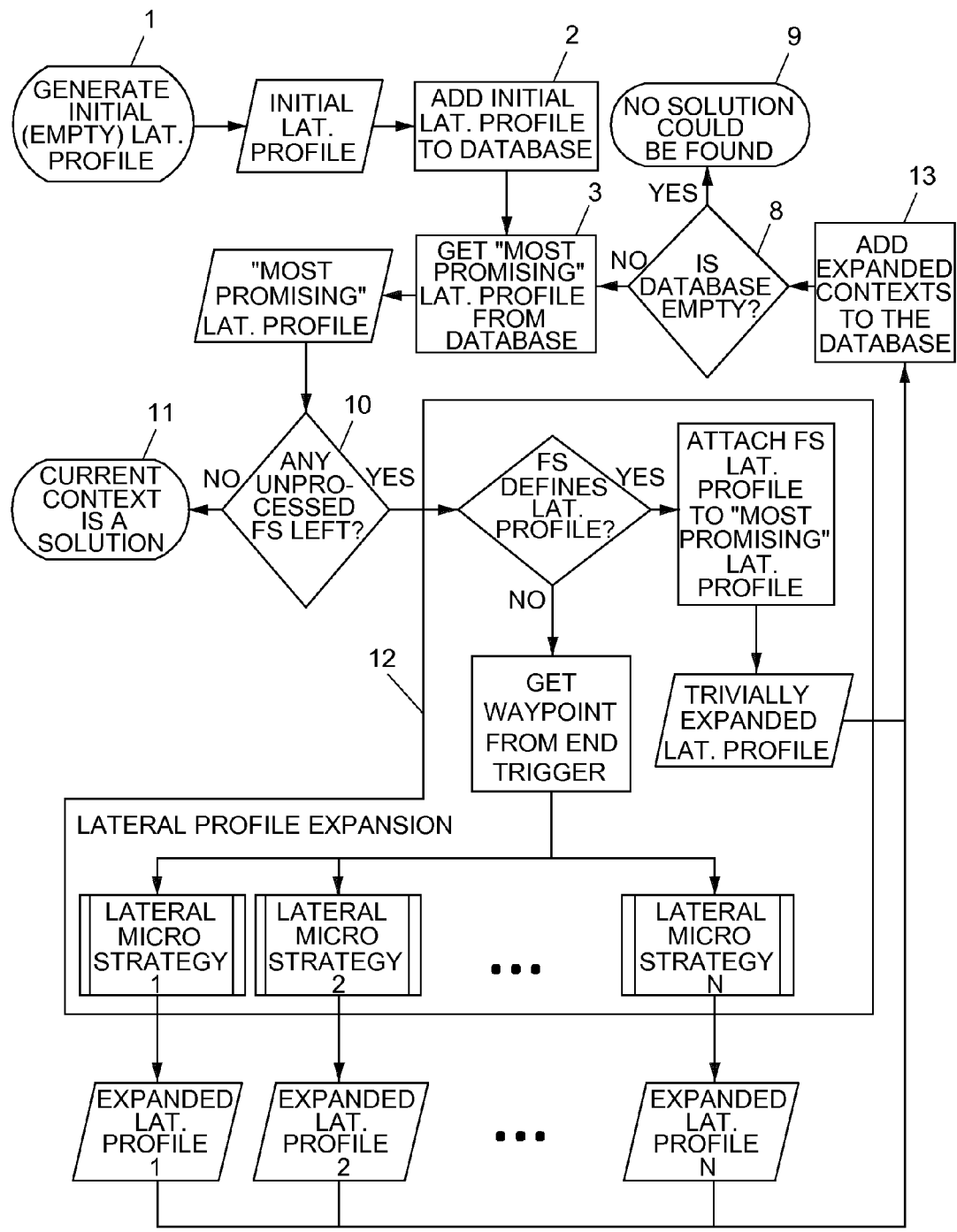
FIG. 5 shows an exemplary diagram of the horizontal or lateral profile generation process.

The Intent Generation Process may then start with a Horizontal Profile Generation Process, whose phases are schematically shown in FIG. 5, performed by a processor module called Horizontal Profile Generation Engine.

This module may contain several algorithms to generate an Intent Composite (IC) instance expressed in ICDL description language; this IC instance, which may be delivered as an output by the Horizontal Profile Generation Engine, may comply with the horizontal trajectory requirements (Air Traffic Control mandatory waypoints, flight segments, types of maneuvers, etc.) imposed in an input Flight Intent (FI) expressed in FIDL description language, and may be compatible with the initial conditions of the flight.

The output of the Horizontal Profile Generation Process may be a set of Intent Composites (IC) that fill up the known lateral thread of the AIDL language, using the initial conditions and an FIDL instance as an input.

As it is shown in FIG. 1, the Intent Generation Process may continue by calculating along-track constraints. This calculation may consist of transforming the geometric domains of application (DoA's) of all constraints given in the form of Flight Intents (FI), into along-track domains of application (DoA's), which are expressed in the form of minimum and maximum along-track distances in the flight track. This process may be schematically shown in FIG. 10.

Figure 10:
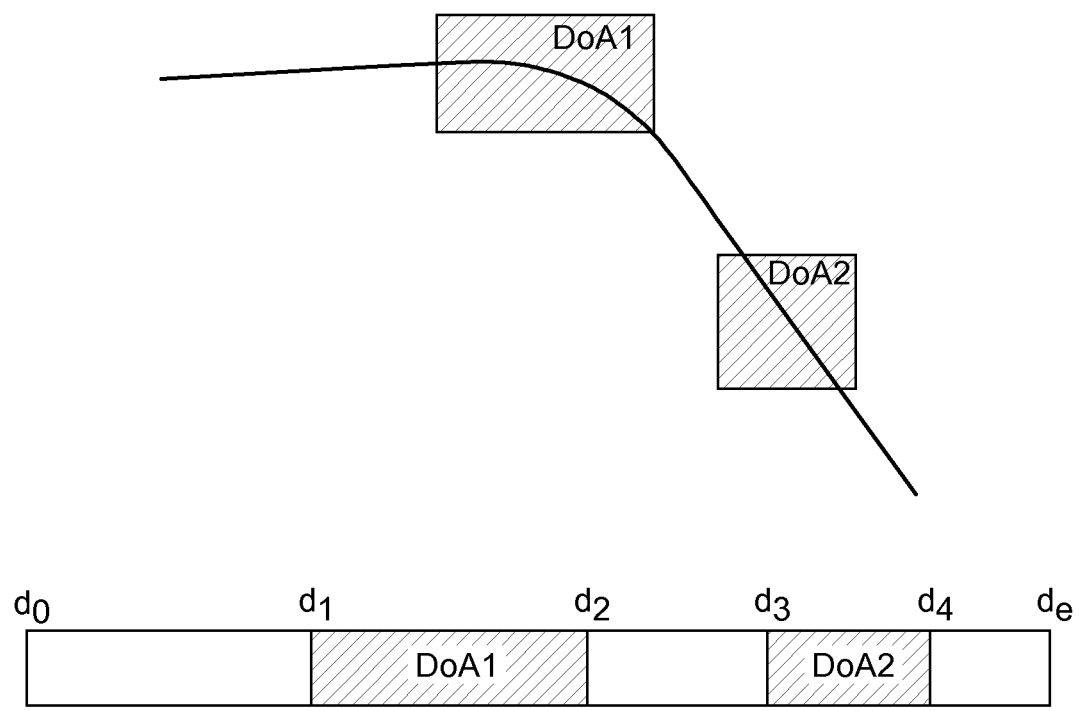
FIG. 10 shows, for an example application, how the domains of application of two flight constraints are translated from the horizontal dimension to the along-track dimension.

FIG. 10 shows, for an example application, how the domains of application of the flight constraints are transformed or expressed in terms of "along-track" domains of application. This example application will be further described in detail.

The Intent Generation Process may then merge the along-track constraints. This may involve taking into account the potential presence of several constraints for a given along-track distance interval and obtaining the intersection of the available values of constrained variables. In a first approximation, height and speed constraints may be processed. To account for atmospheric variations of pressure and temperature, QNH corrections may be performed over the pressure altitudes below the transition altitude. Additionally, different kinds of height and speed found in Flight Intent (FI) constraints may be converted to canonical definition: pressure, altitude and CAS (Calibrated Air-speed) or Mach speed (but only one of these kinds of speed may be active at a time).

A recursive process, which may constitute an embodiment of the method of the present disclosure, defines an ordered set of actions, each of them devoted to the resolution of a given constraint. Each action in the sequence can be of height or speed constraint fulfilling type, and it may be performed prior to the entrance in the constrained domain of application of that constraint.

Figure 2:
FIG. 2 shows an exemplary action sequence, intended to comply with the Flight constraints given as an input to the process in FIDL description language.

FIG. 2 shows an exemplary diagram of a simple action-sequence, intended to comply with the Flight constraints given in FIDL description language as an input to the process.

FIG. 2 shows an action sequence comprising an altitude action, a speed action and a hold action along with a trigger located at a determinate along-track distance, d1, the action sequence intended to comply with some altitude and speed constraints.

Several possibilities arise regarding the time/distance to perform each action, and the relative ordering of height and speed related actions.

To manage this combinatorial problem, a tree of hypotheses may be built. Then, in a recursive manner (using an exhaustive or heuristic search approach) different action-sequences may be obtained as leaves of this tree of hypotheses.

An action can be understood as a maneuver that affects the speed or altitude of the aircraft. An action sequence may contain speed actions, altitude actions, holding actions (in which neither speed nor altitude are affected), and fixed positions (which indicate significant points along the trajectory).

The tree of hypotheses may be built in a predefined order and if a given node does not lead to a solution (a feasible optimal trajectory), a new hypothesis (tree node, containing a new different whole action-sequence) may be attempted.

The order in which hypotheses are built may be governed by the fitness functions of the hypotheses themselves. The hypotheses with higher fitness values may be explored first. As said before, fitness values may depend entirely on heuristics, that is, estimations of the actual "fitness".

Action sequences may be converted to a set of consecutive ICDL vertical and longitudinal sentences, each sentence related to an action intended to make the aircraft comply with each vertical and longitudinal flight constraint.

Different IC sentences may implement a given action, and ICDL profile intervals may be derived from constrained-variable intervals.

Configuration ICDL instructions may be calculated and combined with horizontal and longitudinal ICDL threads, in order to cover all AIDL threads.

The next step of the Intent Generation Process is the optimization of ICDL intervals. This step may be in charge of performing a search over ICDL intervals by integration of ICDL sentences, in which some values (which had been left open in the action-sequence computation) are further particularized. ICDL sentences may be evaluated for a given vector of values for all potentially variable parameters, by: a) transforming them into AIDL and invoking a suitable trajectory computation infrastructure, which is in charge of translating an AIDL sentence into a trajectory; b) checking if the provided trajectory is compatible with all Flight Intent (FI) constraints; c) evaluating the quality of the obtained trajectory using user preferences parameters and FI objectives definition, and; d) selecting the ICDL associated to the best trajectory compatible with the FI constraints.

The quality of a trajectory may be the result of a particular "merit function" that takes such trajectory as input and provides a single scalar value as output. This "merit function" may depend entirely on what the user of the Intent Generation engine wants. Most ATM users want to optimize time and/or fuel costs. However, the "merit function" can be an arbitrary function, either provided by the user either explicitly or implicitly.

If the provided ICDL interval optimization does not provide any trajectory compatible with all FI constraints (feasible trajectory), a new leaf in the hypotheses tree may be evaluated, and then the process may iteratively return to the step in charge of building the tree of hypotheses. Thus, a new hypothesis, with different action-sequence ordering is evaluated in search for a solution.

Finally, when a feasible optimal trajectory has been found, the corresponding action-sequence given in ICDL sentence may be translated to AIDL and yielded as a result of the Intent Generation Process.

The Horizontal Profile Generation Process, the Vertical Profile Generation Process and the Configuration Profile Generation Process, which may be part of the Intent Generation Profile (which in turn is the key of the Trajectory Generation/Prediction Process according to the Description Languages philosophy given by FIDL, ICDL and AIDL), are the targets of the preferred embodiment of the present method for creating and choosing a determinate aircraft piloting strategy.

Figure 6:
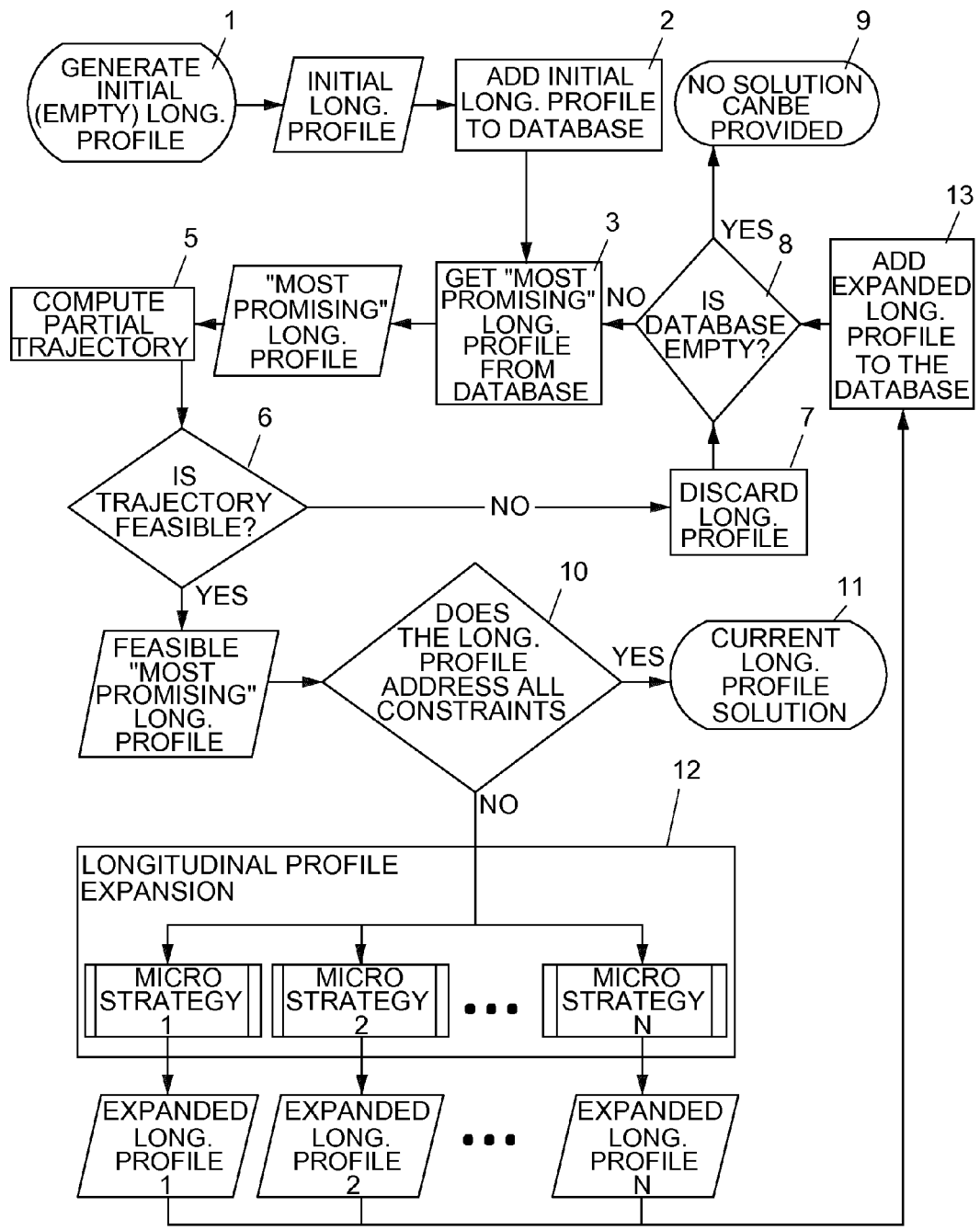
FIG. 6 shows an exemplary diagram of the vertical or longitudinal profile generation process.

The Horizontal (lateral) and Vertical (longitudinal) Profile Generation Processes may be comprised by a series of steps, which are schematically shown in FIGS. 5 and 6 respectively, which basically conform with the 13 steps of the method shown in FIG. 3.

Vertical Profile Generation Process may takes place after performing the Horizontal Profile Generation Process.

The only exception, considering the Horizontal Profile Generation Process depicted in FIG. 5, when compared to the steps of the method described below (which are depicted in FIG. 3), is that the Horizontal Profile Generation Process (FIG. 5) obviates the phases further described in steps 4, 5, 6 and 7 of the method (FIG. 3), that is, the Horizontal Profile Generation Process does never end by discarding any context (that is left to the Vertical Profile Generation Process which comes immediately after the Horizontal profile generation Process), and it does not comprise the computation (and further verification of its feasibility) of a partial trajectory either.

Figure 4:
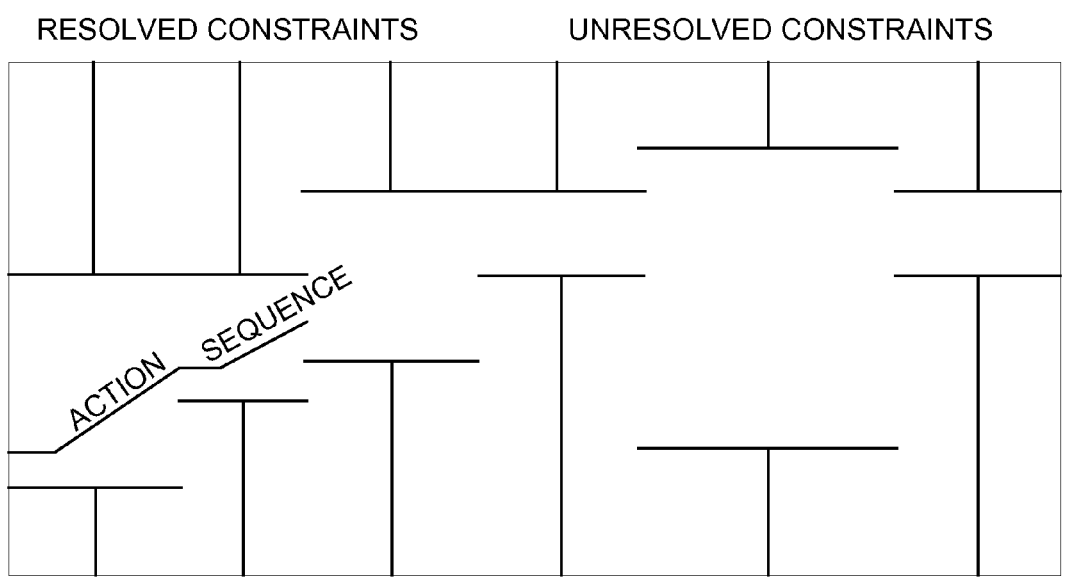
FIG. 4 shows a schematic diagram describing an exemplary context comprising a set of resolved and unresolved flight constraints.

Step 1: The first of all these steps may be the generation of the initial context (1). The contents of a context in this process are schematically shown in FIG. 4.

Contexts may contain a sequence of actions, a set of resolved constraints and a set of unresolved constraints (of both altitude and speed type), a partial trajectory corresponding with the sequence of actions, and a fitness value of the context. The sequence of actions, as previously described, may describe a series of maneuvers to be performed by the aircraft in order to address all the resolved constraints.

Therefore, the set of resolved constraints (either of altitude or speed type) may contain all the constraints in the flight that have already been addressed.

On the other hand, the set of unresolved constraints (either of altitude or speed type) may contain all the constraints in the flight yet to be addressed.

In the initial context, the action sequence and the set of resolved constraints may be empty, while the set of unresolved constraints contains all the constraints in the flight.

Step 2: The initial context may be added (2) to a context database or a list of flight contexts. This database may be a collection of all the contexts generated by the process. At the beginning of the procedure, the database may only contain the initial context.

The database is the place where the decision tree containing all the possible piloting strategies may be kept.

The procedure is capable of either building up a whole decision tree with all the possible (feasible) piloting strategies conforming with the given flight constraints, allocating a certain score (fitness value) to each of these piloting strategies and afterwards choosing the one which has been allocated the highest score according to certain given criteria, or either building up the decision tree in a partial way, only extending the branches of the tree which come from the leaves corresponding to the piloting strategies which have got the highest score at a given step of the recursive process.

If the decision tree is built up in a partial way and, at a given step of the recursive process, a first piloting strategy corresponding to the last leaf of a first tree branch which has been extended may be allocated a lower score than other second piloting strategy corresponding to the last leaf of another second tree branch which had been previously interrupted because the second piloting strategy had not the highest score at a previous step of the process, then the process may continue by extending the mentioned second tree branch, provided that the mentioned second piloting strategy has got the highest score at the given step.

Step 3: The "most promising" context or the context with highest fitness value allocated, may be gathered (3) and removed from the database.

The "most promising" context may be the one obtaining the highest score (fitness value) according to the mentioned given criteria.

The score can be either a measured value extracted from the partial integrated trajectory (if a partial trajectory can be computed, which corresponds only to the Vertical Profile Generation Process), a heuristic value (that is, an estimated value obtained from other information in the context), or a combination of both.

Integrating a partial trajectory means computing a predicted trajectory derived from the action sequence of a given context. Therefore, it may involve assessing to what extent does a partial trajectory (corresponding to the portion of the flight whose constraints have already been addressed) conform with the imposed flight constraints and the user preferences, and then allocating a score by evaluating a function over some measures of the trajectory (such as consumed fuel per solved constraint, elapsed time, average velocity, etc.).

Obtaining the score heuristically means estimating the conformance of the context based on information that cannot be measured accurately. A heuristic value could be based on an estimation of the time remaining until the end of the flight. A different heuristic value could be obtained by estimating the probability of a human pilot to perform a particular sequence of actions given the same constraints.

Choosing the right criteria for obtaining the score may increase the efficiency and optimality of the process.

A purely-heuristic criterion has proved to provide a good trade-off between efficiency and optimality of the process, in terms of computation time and conformity with the given constraints and user preferences.

Step 4: If a partial trajectory can be computed (Vertical Profile Generation Process), the method may continue in step 5; if not (Horizontal Profile generation Process), the method may continue in step 10.

Step 5: The partial trajectory corresponding to the "most promising" context, or the context with highest associated fitness value may be obtained (5) by integration of the action sequence.

A special case occurs when the "most promising" context (the piloting strategy which, at a given step, has got the highest score) contains an empty action sequence; in such cases an empty trajectory may be obtained as a result for this process (no integration is required).

ICDL instances univocally refer to differential equations which can be integrated rendering mathematical expressions which represent the elemental trajectories of each Flight Segment (FS).

Step 6: The process may check (6) whether or not the partial trajectory obtained in the previous step is feasible. Two basic checks may be performed at this step.

The first one is to check whether or not the trajectory is flyable. A trajectory may not be flyable if the integration of the partial trajectory reports problems such as incompatibilities with the performance of the aircraft, insufficient fuel or unsafe maneuver.

If the trajectory is not flyable, then it may not be feasible.

An empty trajectory may always be feasible.

The second check is assessing whether or not the integrated partial trajectory meets all the resolved constraints. If it does not meet all the resolved constraints, then it may not be feasible.

For instance, some actions to address a constraint could be simply of the type: "ignore the constraint". This may be done to avoid that certain constraints add a maneuver in the action sequence. For example, considering a descent from 10000 ft, with an "AT or ABOVE 5000 feet" constraint in a waypoint, and further down, another "AT 2000 feet" in another waypoint. The algorithm might decide to ignore the first one, try to accomplish the second one directly and afterwards verify if the previous one has been also achieved. In some cases this would be feasible; in other cases no. This may be done to emulate a backwards integration that many Trajectory predictors can do, and also to avoid that constraints that are present in the flight but which are not affecting the flight are been taken into consideration when defining the piloting strategy sequence.

If the trajectory is feasible, then the process may jump to Step 10.

Step 7: If the trajectory is not feasible, then the context may be discarded (7).

Step 8: The process may check (8) whether the context database (the list of contexts) is empty if it is not empty, the process returns to Step 3, when the next "most promising" context (the context with highest fitness value) is gathered.

Step 9: If the context database is empty, then the context database may not be able to provide a valid solution to the set of constraints provided. The process may finished (9) with no result.

Step 10: If the "most promising" context (the context with highest fitness value) is feasible, then the process may check (10) whether this context still has unresolved constraints. If it does, the process may jump to Step 12.

Step 11: If the context has no unresolved constraints, then it has already integrated a feasible trajectory (if the method is applied to the Vertical Profile Generation Process) that meets all the constraints in the flight (during Step 5 of the method), and/or it has found that the current context is a solution. That means that the action sequence in the context is a valid solution, and the process may finish (11).

Step 12: If the process has one or more unresolved constraints, then it may be expanded (12).

Expanding a context (which can equivalently be expressed as expanding a node or a leaf of the decision tree, or either expanding a piloting strategy) may mean addressing one or more unresolved constraints, thus moving them to the set of resolved constraints.

The elements in charge of expanding a given context may be processing modules and the schedule they follow to address the constraints may be called a "micro-strategy".

These "micro-strategies" (and the processing modules in which they are implemented) may be in charge of adding new actions to the action sequence of a context, in order to meet the addressed constraints during their execution interval.

Micro-strategies may either add speed-actions, altitude-actions or configuration-actions to generate both the vertical action-sequence and the configuration action-sequence.

Figure 7:
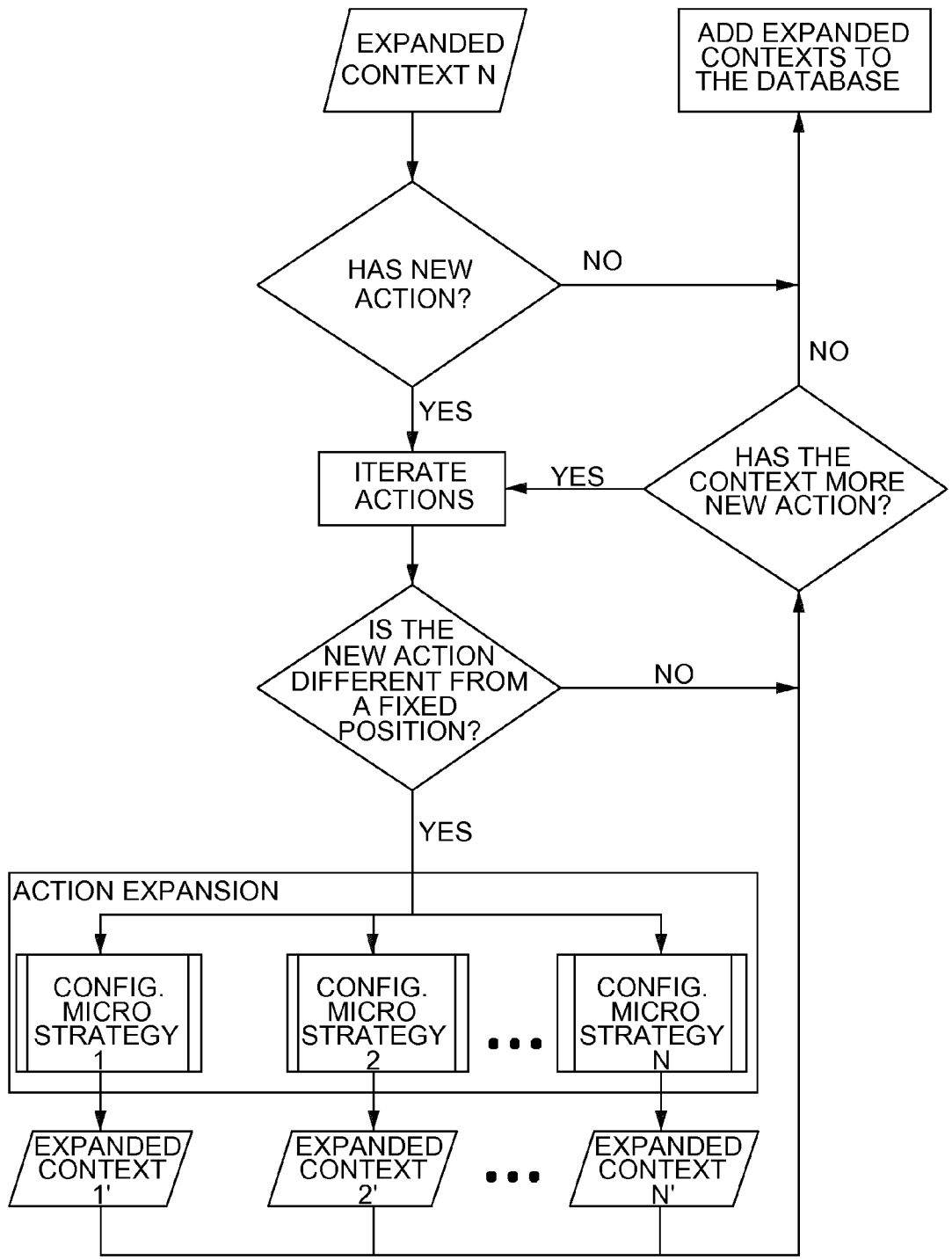
FIG. 7 shows an exemplary diagram of the configuration profile generation process.

FIG. 7 schematically shows how different micro-strategies address the allocation of configuration actions to a context which has been previously expanded in order to add vertical actions (altitude and speed actions) to the action-sequence.

As has been previously said, many different combinations of configuration actions allow addressing a given vertical action-sequence.

Figure 8:
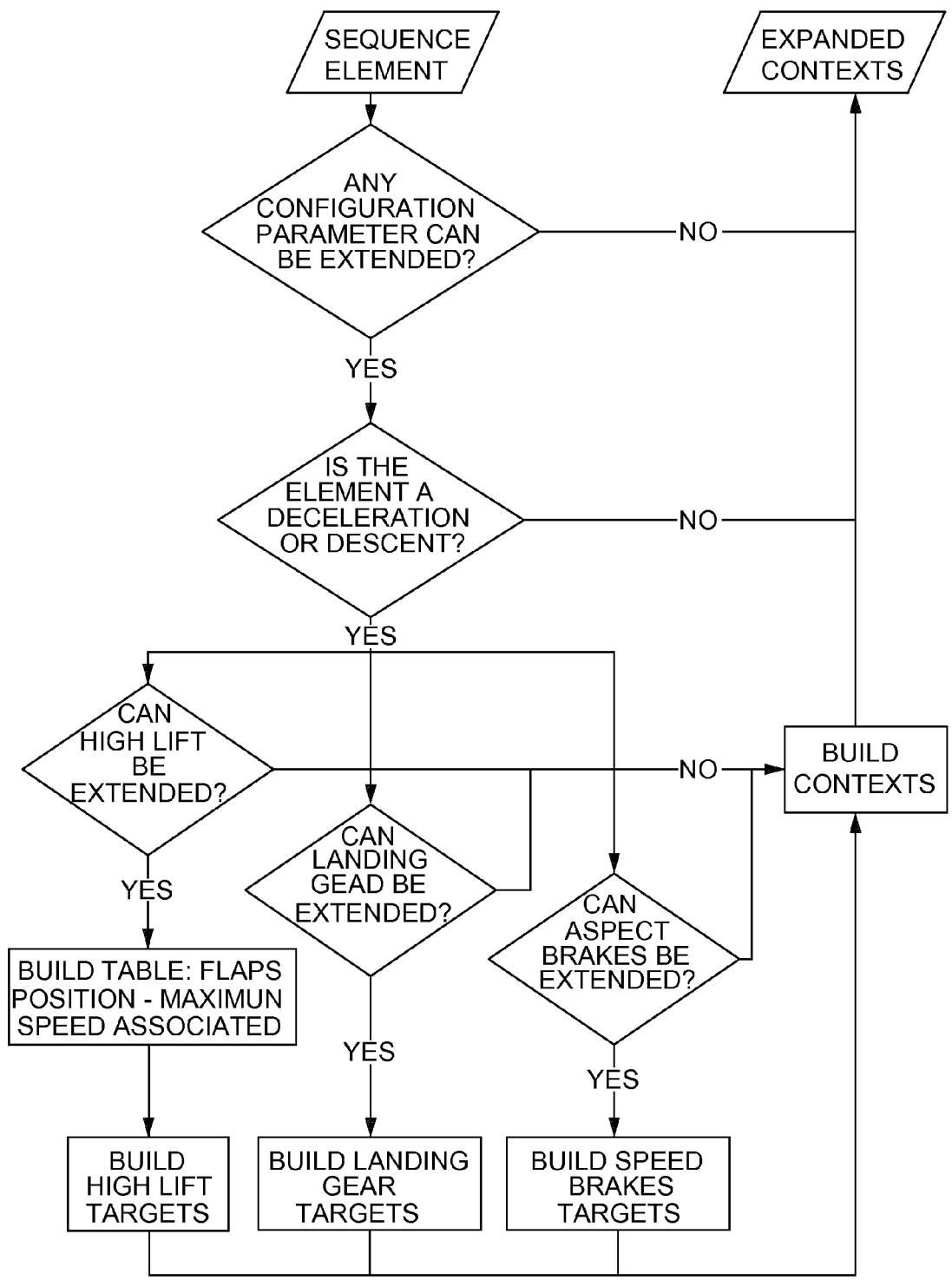
FIG. 8 shows an exemplary diagram of the extension configuration, which is a particular case of the configuration profile.
Figure 9:
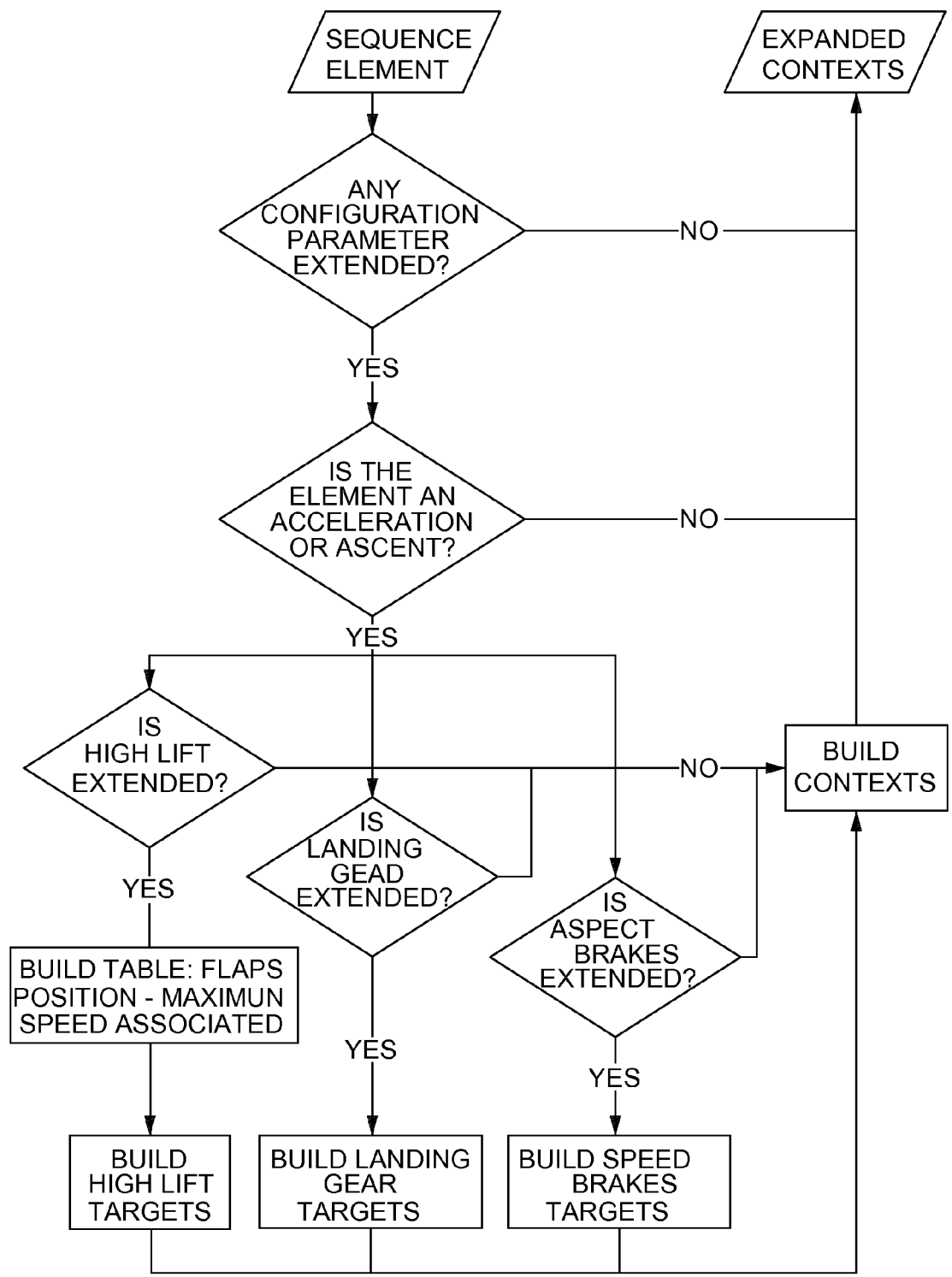
FIG. 9 shows an exemplary diagram of the retraction configuration, which is a particular case of the configuration profile.

FIGS. 8 and 9 schematically show how extension and retraction configuration actions are added to the configuration action-sequence of a context.

Each constraint may have an execution interval, which is the Domain of Application (DoA) in which said constraint is active. If the DoA of a constraint refers to a Flight Segment (FS) delimited by two along-track distances, d1 and d2, then the execution interval of an action introduced in the action sequence in order to meet that constraint extends from d1 to d2.

Usually, there is more than one way of expanding a given context: different unresolved constraints can be addressed, and the addressed constraints can be solved by adding different actions to the action sequence.

The modular design of this process may delegate the context expansion to several sub-steps, i.e. the "micro-strategies".

Each "micro-strategy" may be designed to address a particular situation. For example, one micro-strategy can focus on altitude constraints requiring a constant speed ascent.

This allows modifying how constraints are addressed without changing the core of the process, making it more maintainable. The information on how to address different situations may be isolated by these "micro-strategies"; thus if the behavior in one particular situation has to be changed, there is no risk that the changes will affect behavior in other situations. Another benefit of this approach is that "micro-strategies" can be enabled and disabled at wish. For example, one would want to disable "micro-strategies" related to CAS-Mach ascents or Mach-CAS descents when using the method to predict trajectories of UAV's that fly at low altitudes.

If a micro-strategy cannot address any of the unresolved constraints, then it may return no result.

A micro-strategy can return zero o more context expansions although, for clarity reasons, in FIGS. 3, 5, 6 and 7, all micro-strategies return exactly one result.

Step 13: All the expanded contexts generated in Step 12 may be added (13) to the context database, constituting the piloting strategies which conform the leaves of the decision tree.

Lastly, the process may continue in Step 3 by selecting a context from the list of contexts (context database) with the highest associated fitness value (most promising context), provided that the list of contexts is not empty (which may be checked (8) again after step 13, though it is not represented in FIG. 3).

In an alternative embodiment of the method, Step 11 does not end the method if a feasible trajectory satisfying all the Flight Constraints is found. Moreover, the context corresponding to a feasible trajectory satisfying all the Flight Constraints may be added to a full-expanded-context database, and then the method may continue again in step 3, by taking the next "most-promising" context from the context database and repeating the subsequent steps.

Afterwards, when step 8 returns an empty context database, the method may check the full-expanded-context database and selects the full-expanded context having been allocated the highest score.

The input of the whole method is a set of constraints along with their domain of application (DoA). For instance, altitude or speed constraints attached to a pair of distances along the horizontal profile indicating the start and the end of those constraints.

Additionally, one or more optimal criteria (i.e. "merit function") can be chosen to go over the decision tree in a specific way. One example of optimal criteria is to achieve a particular cost index (CI). The cost index is the way airlines measure the relative weight of the time- and fuel-dependent costs, and it is given by:

$$CI = \frac{C_{TIME}}{C_{FUEL}}$$

The higher the CI, the bigger the importance of the time-related cost on the route to fly. If the time cost is negligible for a given flight, the result will be the use of a very small CI (tending to zero). If the time costs are great in consideration to the fuel cost, the result will be a higher CI which will lead to a higher flight speed, faster flight.

The output of the method may be a sequence of actions that can be trivially translated into an ICDL instance.

This action sequence (or its equivalent ICDL sentence) may describe a series of maneuvers to be performed by the aircraft so all the constraints are met in their respective domains of application (DoA's).

The micro-strategies may address the given constraints in a way that they do not only define what vertical or speed action is to be performed by the aircraft, but also what configuration action (extension and/or retraction maneuvers of the high lift system, speed brakes and landing gear) may be carried out by each specific aircraft in order to fulfill that action and thus, comply with the addressed constraint.

Therefore, the output of the method specifies a series of actions (vertical/speed/configuration actions) that fully and univocally define an aircraft trajectory that complies both with the given Air Traffic Control constraints and with the user preferences, as well as with the Aircraft Performance Model (physical limitations of the aircraft).

As explained before, there are two key elements to the performance and optimality of this process: the micro-strategies and the "most promising" criterion. These two elements can be seen as the configurable features of the process.

As has been said, the micro-strategies may be the elements of the process that generate the action sequence. Micro-strategies discretize the search space, as only the actions contemplated in the micro-strategies can be generated in the process. In general, this means that the more different micro-strategies are used, the more optimal the result will be.

However, too many micro-strategies can make the search space incomputable in practice.

The "most promising" criterion can drastically impact the way the method works.

In a preferred embodiment, a fitness function f(x) is defined to evaluate the contexts, where "x" is the evaluated context. The output of this fitness function may be the score of the context, and the context with the highest score is taken by the method as the "most promising".

Some search algorithms can be used in this process by picking the adequate fitness function. For example, if the fitness function is defined as the number of constraints in the set of resolved constraints, the process would behave as a "depth-first" search algorithm.

Contexts with more resolved constraints, which are deeper into the tree, would have the highest fitness values and therefore would be the first ones to be expanded further, until a leaf node is reached. This method aggressively tries to reach a leaf node as soon as possible. In the opposite case, where, the fitness function is defined as the number of constraints in the set of unresolved constraints, the process would behave as a "breadth-first" search algorithm. This type of search may be highly inefficient for the kind of problem to be solved by this method.

An optimal solution to the discretized problem can be obtained if the fitness function is designed so that the process behaves as an A* (a-star) algorithm. In this case, the fitness function may be defined as $f(x)=-(c(x)+h(x))$, where c is the cost of the partial trajectory, and h is an estimation of the cost of the rest of the flight (which must not overestimate the real cost). The particular definition of functions c and h depends on what is to be optimized.

For example, if the target was to optimize fuel usage, the cost c(x) could be the fuel burnt during the partial trajectory (data which can be obtained from the computed trajectory), and h(x) could be an estimation of the fuel that would be used until the end of the flight based on current position and altitude (this estimation could be obtained by integrating a trajectory direct to the final point and no constraints).

While a discrete optimal solution may be guaranteed, this implementation can perform worse than others in computation time. An A* search requires examining all potentially optimal contexts, and, since at early stages most contexts are potentially optimal (as their cost c(x) is very low), many contexts will be expanded before reaching a solution. In other words, a leaf of the tree will only be reached once all internal nodes of the tree have been discarded.

The following is an explanation of how the horizontal profile algorithm, the vertical profile algorithm and the configuration profile algorithm may work. They are respectively involved in the horizontal, vertical and configuration profile generation.

They can be briefly summarized as follows.

Horizontal Profile Algorithm:

The horizontal profile algorithm is responsible for generating the horizontal—also known as lateral—profile of the flight. The resulting horizontal profile must comply with the input Flight Intent (FI).

This algorithm collects sequences of waypoints (and its tolerances) from the end triggers of the Flight Segments (FS) and generates a geometric lateral path. However, some of the FS's may have the lateral path defined, so the algorithm must also be able to manage this case.

The horizontal profile algorithm maintains an intent composite (IC) with the accumulated lateral path, which is initially empty. All the FS's of the input FI are processed sequentially, one at a time. If the FS does not define the lateral path of that stretch of the flight, then the waypoint in the end trigger of the FS is stored in a waypoint list. If the FS defines the lateral path, then the algorithm is used to generate a lateral path for the waypoint list, the waypoint list is cleared and both lateral paths—the one generated and the one retrieved from the FS—are added to the accumulated lateral path. When all the FS's have been processed, the accumulated lateral path is the output of the algorithm.

This process is outlined in FIG. 5.

Vertical Profile Algorithm:

The vertical profile algorithm is responsible for generating the intent composites (IC) corresponding to the vertical (or longitudinal) profile.

The input of the vertical profile algorithm consists on the enriched Flight Intent (FI) and an IC containing the horizontal (or lateral profile). The output of this algorithm, if successful, consists on a complete IC specifying the behavior of the aircraft but perhaps leaving some composite intervals open for later optimization.

Some preprocessing of the input is required before the actual algorithm can be run. As shown in FIG. 1, the constraints in the FI have to be computed and transformed into along-track constraints, that is, the spatial domains of application are converted to one (or more) domain of application defined simply by their initial and final along-track distances. The track is known at this time as the lateral profile is available in the input IC. If the domain of application contains information that cannot be transformed into along-track distances (such as altitudes or speeds), then such information is kept without any transformation. The last step of the preprocessing is the merging of the along-track constraints. Constraints which their effect affects the same magnitude (altitude or speed) are sorted by their initial and final distances and, if two or more of these constraints overlap, they are merged into one, where the resulting effect is the one that, if met, the initial constraints are met.

When the preprocessing is completed, the initial context can be generated. The context is a data structure that contains all the information needed to make a decision on what the next maneuver of the aircraft will be. This may include the following:

A list of unresolved altitude constraints sorted by their starting and end along-track distances.

A list of unresolved speed constraints sorted by their starting and end along-track distances. Speed constraints may have different speed limits depending on the altitude.

A list of resolved altitude constraints.

A list of resolved speed constraints.

A sequence of actions (maneuvers) to be performed by the aircraft. The sequence of actions includes the initial altitude and speed of the aircraft.

A partial trajectory corresponding with the sequence of actions described above.

A fitness value of the context. This is a scalar value that tries to quantify how close is this context from being a valid strategy for the whole flight.

Action Sequences:

The action sequence is one of the most important elements of the context data structure, as it is a condensed way of representing intent on the longitudinal (or vertical) profile. Basically, an action sequence is a list of three different types of elements.

One of these elements is the Action element. An action in the action sequence represents a maneuver that causes a change in the speed or altitude of the aircraft. Ascents, descents, accelerations and decelerations are examples of actions.

The second element of the action sequence is the Hold element (also called no-action element). This element represents a maneuver that doesn't cause any change to the speed or the altitude of the aircraft.

The third element of the action sequence is the Fixed Position element. This element represents a point along the flight, and it is defined by the along-track distance of such point in the lateral profile.

These three elements can be combined to create complex sequences of actions. Action sequences can be translated into ICDL composites defining the vertical profile. For example, FIG. 2 shows an action sequence: an action element, a hold element, a fixed position and another action. This example could be translated to an IC that commands the aircraft to perform some maneuver affecting the altitude and, when the first maneuver is completed (the desired altitude has been reached), do a level flight while also holding speed until the point at distance d1 is reached; finally perform a maneuver that affects the speed of the aircraft until completed.

Actions in the sequence may describe many different types of maneuver: it can be a level thrust acceleration, a Mach-CAS descent or a constant path descent, among others. All actions can be classified as altitude actions, if the maneuver affects the final altitude, and velocity actions, if the maneuver affects the final speed. An action can be an altitude action and a velocity action at the same time, if it affects both altitude and speed. Altitude actions have a target altitude and velocity actions have a target speed. As occurs in ICDL, the target altitude or speed may consist on an interval of values. These values allow computing an estimated altitude or speed at the end of the sequence (optimization of the action-sequence, according to user preferences).

Sequences of actions may conform to the following rules:
1. Action sequences may consist of a list of Action, Hold and Fixed Position elements.
2. Action sequences start with an implicit fixed position element corresponding with the initial position (the corresponding distance is zero).
3. Exactly one hold element must appear between any two fixed positions (including the implicit initial position), and cannot appear anywhere else. This means no two fixed positions can be juxtaposed, as there would be no information on how to fly from one position to the other.
4. Fixed positions must appear in the sequence in crescent distance order.
5. An action element must include information regarding what the maneuver is and when should it stop.
6. Two action sequences are equal if and only if they have the same elements and in the same order.

Actions are maneuvers that should be performed one after the other. If an action appears after a fixed position, it means that the action should start when such position has been reached. On the other hand, if an action (or several consecutive actions) appears before a fixed position, it means that it should start so that the action finishes exactly when the position is reached. Hold elements can be seen as the elements filling the gaps between actions where there is nothing else to do.

The Context Database:

The context database (list of contexts) may be a data structure used to store the different contexts generated by the algorithm and retrieve them in an efficient manner. The context database may be a heap implemented as a priority queue, which allows adding new contexts to the database and retrieving the context with the highest fitness value in O(log n) time, where n is the number of contexts in the database.

This choice is relevant because retrieving the "most promising" (i.e. the one with highest fitness value) context and inserting a new context in the database are very frequent actions in the algorithm.

Partial Trajectory Computation:

One of the most time-demanding tasks is the computation of the partial trajectory. Significant effort has been invested in reducing this time by avoiding integrating the same partial trajectory twice. That is the reason why each context may store a partial trajectory corresponding to the current action sequence. This way, every time new actions are added to the action sequence, only the stretch corresponding to the new actions has to be computed. If no new actions are added, the computation step can be skipped. This requires a Trajectory Computation Engine (TCE) to be capable of resuming the computation of a trajectory.

Context Expansion:

As long as a context has unresolved constraints, it can be expanded to generate new contexts that are closer to the final solution of the intent generation problem. To guarantee that the algorithm will eventually finish, expanded contexts may have at least one unresolved constraint less than the original context.

There are many different ways of expanding a context: an altitude or velocity constraint may be addressed, or even a combination of both; also, there are several ways of addressing one or more constraints. In order to achieve a modular way of organizing context expansions, the concept of "micro-strategy" has been introduced. A micro-strategy is a small system that takes a context as input and generates (if useful) expanded contexts which address a particular constraint in a particular way.

Constraint Filtering:

The FI received by the Intent Generation Core Process (IGCP) of FIG. 1, may contain constraints that allow speeds or altitudes that are not desirable. For example, if during the descent, at some point, the aircraft is allowed to climb to a higher altitude, it is more desirable that the aircraft stays at the same altitude, because the aircraft would have to descend again shortly after the climb. A low-altitude level flight is not the best solution optimization-wise, because it contradicts the principle of "staying as high and fast as possible as long as possible"; and yet it is better than a short climb followed by a short descent.

In order to avoid this kind of unnecessary changes in altitude and speed, constraints may be filtered so that only desirable altitude and speed ranges are considered. For constraints that require an increase (decrease) in altitude or speed, the resulting maximum (minimum) boundary of the constraint is the maximum (minimum) allowed altitude or speed that doesn't force the aircraft to decrease (increase) altitude or speed due to a future constraint. The resulting minimum (maximum) is the one of the original constraint, as it does not require any filtering.

Figure 17:
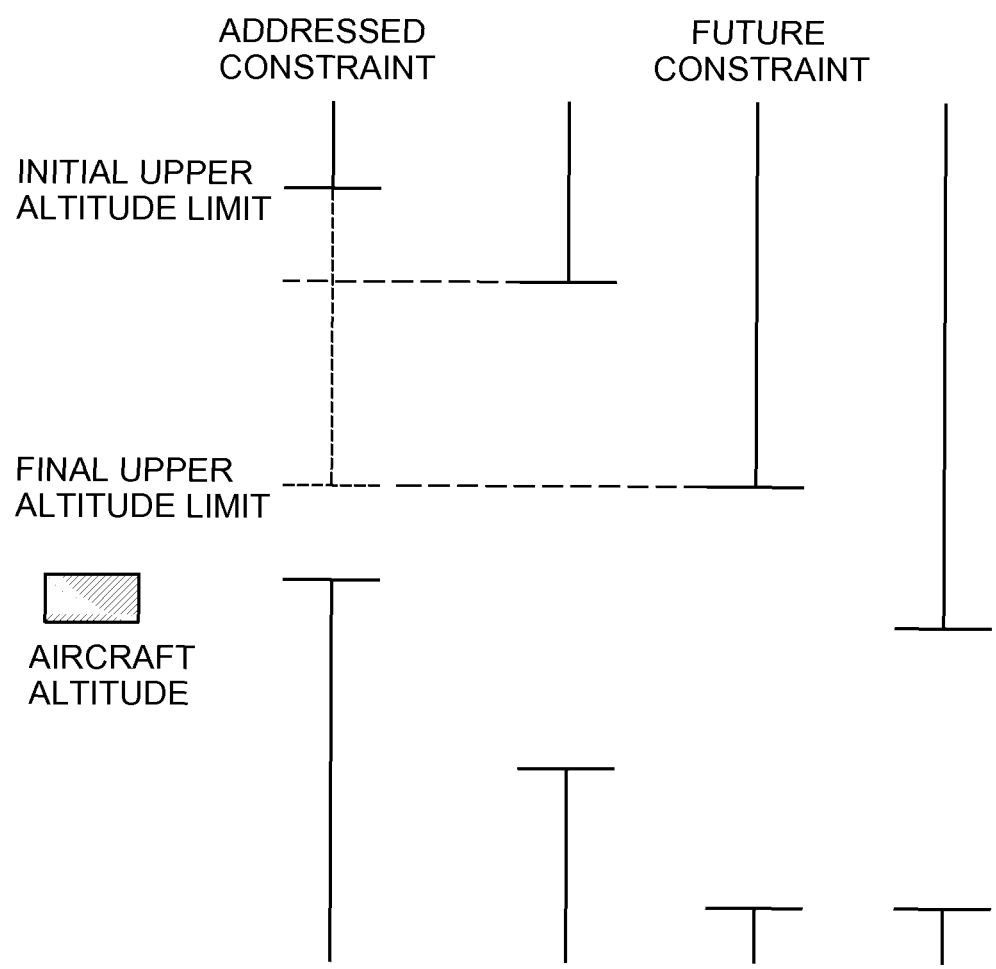
FIG. 17 shows an example of filtering for a constraint in case the action to be taken is an ascent.

FIG. 17 shows an example of filtering for a constraint in case the action to be taken is an ascent. If an ascent micro-strategy decides an ascent may be useful in this context, it would filter the upper altitude limit so that the aircraft will not ascend more than desirable.

Vertical Profile Micro-Strategies:

This section describes some examples of the micro-strategies included in the vertical profile algorithm. The input of a micro-strategy is a context and the output is a set containing zero or more contexts. Output contexts are based on the input context but address at least one constraint that was previously unresolved. Micro-strategies mark a constraint as addressed by moving it from the unresolved constraint list to the resolved constraint list. As the number of unresolved constraints decreases every time a micro-strategy produces a result, the algorithm is guaranteed to finish if a solution can be found.

Some new terms are used in the description of the micro-strategies, whose definition can be found below.

The expected altitude is the estimated final altitude at the end of the action sequence in the input context. The expected altitude has a minimum, maximum and default value (which must be between the other two).

The expected velocity is the estimated final speed at the end of the action sequence in the input context. The expected velocity has a minimum, maximum and default value (which must be between the other two).

The target altitude of a constraint is the altitude imposed by the effect of an altitude constraint. The target altitude has minimum and maximum values.

The target velocity of a constraint is the speed imposed by the effect of a velocity constraint. The target velocity has minimum and maximum values.

Acceleration Micro-Strategies

The acceleration micro-strategy may address a velocity constraint by performing a level thrust acceleration. This micro-strategy only generates new contexts if the following conditions are met:

There is at least one unresolved velocity constraint left.

The first unresolved velocity constraint affects the expected altitude.

The maximum target velocity of that constraint is higher than the minimum expected velocity. That is, the constraint may need the aircraft to increase the speed.

If conditions are met, two contexts are added to the output set. Both add a level thrust acceleration (LTA) action (which is a velocity action) to the sequence; but while one of them appends the action at the end of the sequence, the other adds a hold action followed by the same LTA action and a fixed position referring to the initial along-track distance of the constraint's domain of application, d1.

If the conditions are met and the input action sequence ends with a fixed position, the micro-strategy adds another context to the output, adding the LTA action just before the fixed position.

In any case the LTA action will have a target velocity equal to the filtered target velocity of the constraint.

Figure 18:
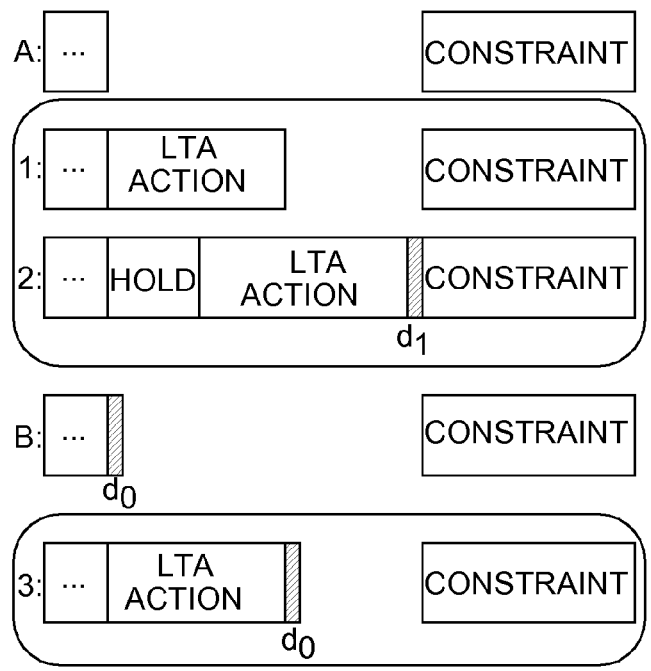
FIG. 18 shows examples of acceleration action-sequences.

FIG. 18 shows the input (A, B) and output (1, 2, 3) action sequences, together with the addressed constraint (at the right end of the action-sequence). Rectangles with suspension points represent any previous elements of the sequence that are not relevant. Therefore, for action sequence A—with no particular position requirements—, two contexts with action sequences 1 and 2 are generated. And, for action sequence B—which ends with a fixed position—, an additional context with action sequence 3 is generated.

Deceleration Micro-Strategies

The deceleration micro-strategy may address a velocity constraint by performing a level thrust deceleration. This micro-strategy only generates new contexts if the following conditions are met:

There is at least one unresolved velocity constraint left.

The first unresolved velocity constraint affects the expected altitude.

The maximum expected velocity is lower than the minimum target velocity, which means the constraint may need the aircraft to reduce the speed.

If conditions are met, two contexts are added to the output set. Both add a level thrust deceleration (LTD) action (which is a velocity action) to the sequence; but while one of them appends the action at the end of the sequence, the other adds a hold action followed by the same LTD action and a fixed position referring to the initial along-track distance of the constraint's domain of application, d1.

If the conditions are met and the input action sequence ends with a fixed position, the micro-strategy adds another context to the output, adding the LTD action just before the fixed position.

In any case, the LTD action will have a target velocity equal to the filtered target velocity of the constraint.

Figure 19:
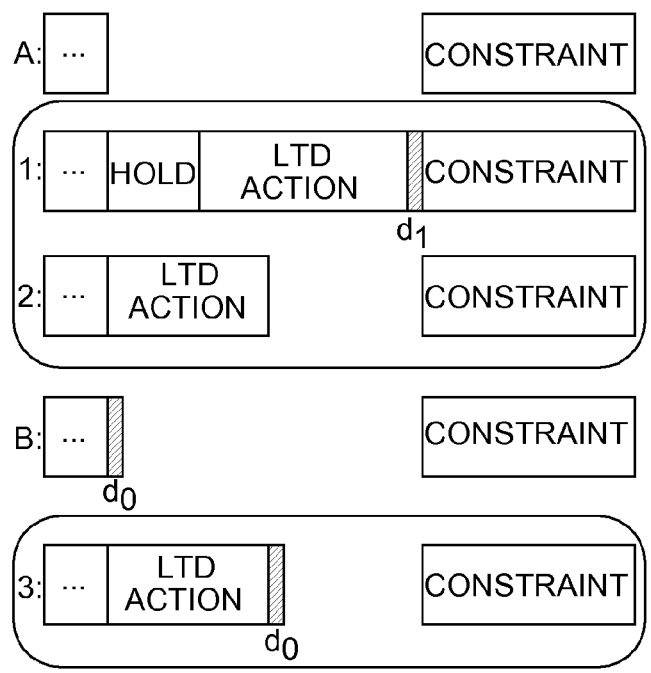
FIG. 19 shows examples of deceleration action-sequences.

FIG. 19 shows the action sequences generated in each case.

Ascent Micro-Strategies

The ascent micro-strategy addresses an altitude constraint by performing a maximum climb throttle ascent (MCTA) action. This micro-strategy only generates new contexts if the following conditions are met:

There is at least one unresolved altitude constraint left.

The minimum target altitude of that constraint is lower than the expected altitude. That is, the constraint needs the aircraft to increase altitude.

This micro-strategy behaves differently if the context contains any ascent-velocity constraints. If it contains an ascent-velocity constraint and the expected velocity isn't within the ascent velocity constraint limits, velocity action (LTA or LTD) has to be added to the sequence before the MCTA. Otherwise, only an MCTA action is added.

Two contexts are added to the output set, plus a third one if the input context's action sequence ends with a fixed position. In the first context, new actions are added at the end of the previous sequence. In the second one, a hold element is added before the actions and a fixed position is added at the end referring to the initial along-track distance of the constraint's domain of application, d1. In the third—optional—context, new actions are added before the fixed position at the end of the previous sequence.

Figure 20:
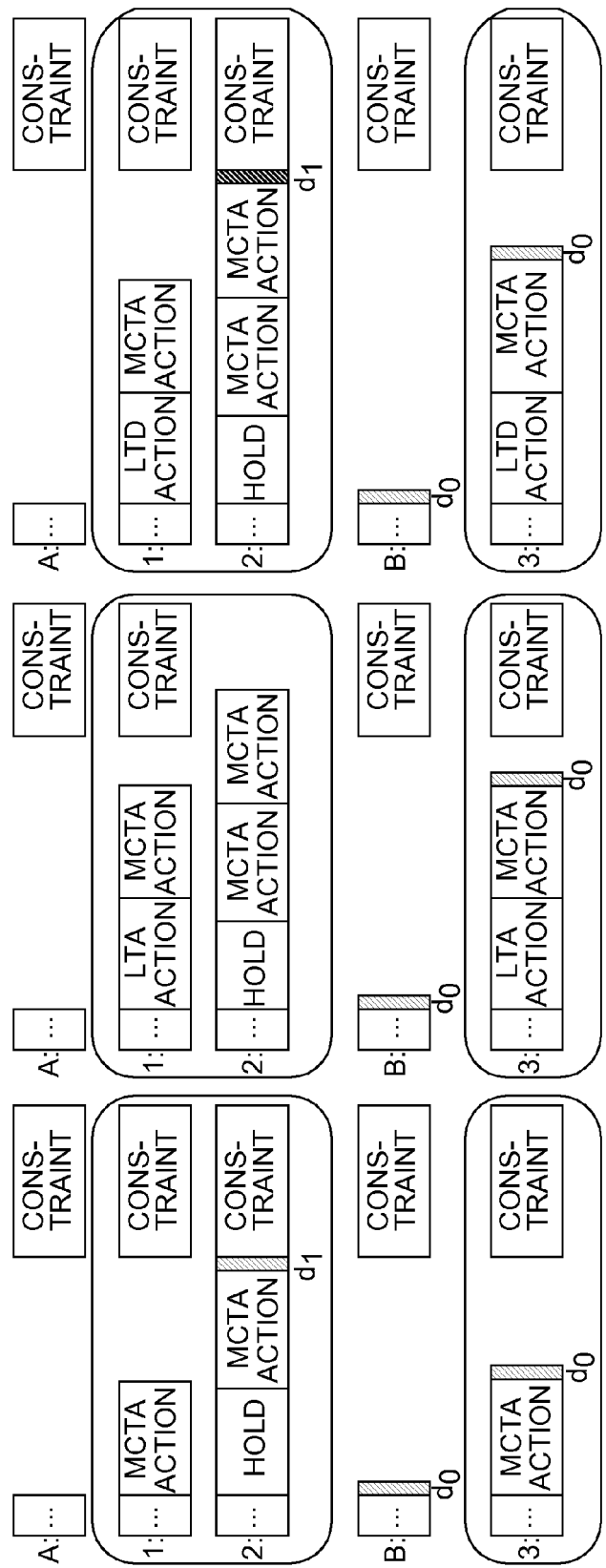
FIG. 20 shows examples of ascent action-sequences.

FIG. 20 shows the action sequences generated in each case. Each column shows each of the three possible cases: a) no velocity action is needed; b) an acceleration (LTA) is needed, and; c) a deceleration (LTD) is needed.

CAS-Mach Ascent Micro-Strategies

The CAS-Mach ascent micro-strategy addresses an altitude and a velocity constraint by performing two MCTA actions: the first MCTA action holds CAS speed, and the second one holds Mach. This micro-strategy only generates new contexts if the following conditions are met:

The expected velocity of the aircraft is given in CAS.

There is at least one unresolved altitude constraint and one unresolved velocity constraint left that overlap along the trajectory.

The target velocity of the aircraft is given in Mach.

The altitude of the altitude constraint affects the velocity constraint.

The maximum target altitude of that constraint is higher than the minimum expected altitude. That is, the constraint may need the aircraft to increase altitude.

If previous conditions are met, and the crossover altitude (altitude at which a specified CAS and Mach value represent the same TAS) computed with the expected and the target speed is between the expected and the target altitude, two contexts are added to the output set. In the first context, two MCTA actions are added at the end of the previous sequence. In the second one, a hold element is added before the two MCTA actions, and a fixed position is added at the end referring to the initial along-track distance of the constraint's domain of application, d1.

If conditions are met and the context contains any ascent velocity constraint, the crossover altitude is computed again but replacing the target speed with the speed of the ascent velocity constraint. If the altitude calculated is between the expected and the target altitude, two contexts are added to the output set. In the first context, two MCTA actions followed by a velocity action (LTA or LTD) are added to the end of the previous sequence. The velocity action depends on which action should be taken to comply with the original target speed of the velocity constraint. In the second context, a hold element is added before the two MCTA actions and the corresponding velocity action (LTA or LTD), and a fixed position is added at the end referring to the initial along-track distance of the constraint's domain of application, d1.

Figure 21:
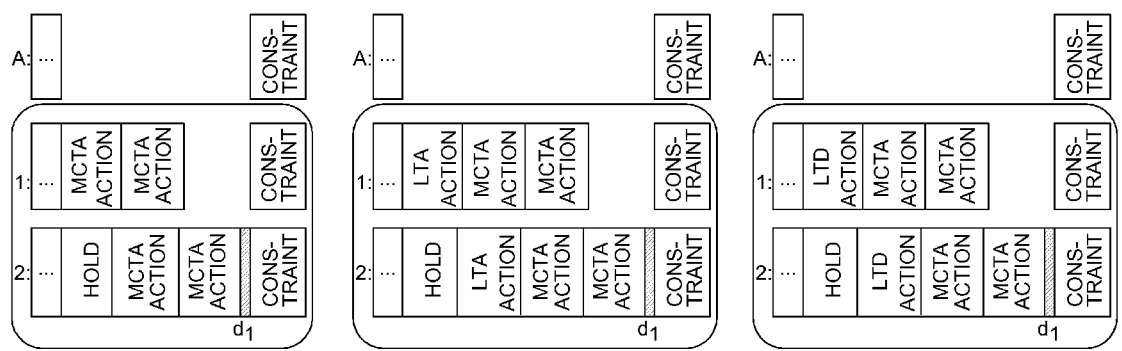
FIG. 21 shows examples of CAS-Mach ascent action-sequences.

FIG. 21 shows the action sequences generated in each case. Each column shows each of the three possible cases: a) no velocity action is needed; b) an acceleration (LTA) is needed, and; c) a deceleration (LTD) is needed.

Descent Micro-Strategies

The descent micro-strategy addresses an altitude constraint by performing an idle throttle descent (ITD) action. This micro-strategy only generates new contexts if the following conditions are met:

There is at least one unresolved altitude constraint left.

The maximum expected altitude of the aircraft is higher than the minimum target altitude of that constraint. That is, the constraint may need the aircraft to decrease altitude.

This micro-strategy behaves differently if the context contains any descent-velocity constraints. If it contains a descent-velocity constraint and the expected velocity isn't within the descent velocity constraint limits, velocity action (LTD or LTA) has to be added to the sequence before the ITD. Otherwise, only an ITD action is added.

Two contexts are added to the output set, plus a third one if the input context's action sequence ends with a fixed position. In the first context, new actions are added at the end of the previous sequence. In the second one, a hold element is added before the actions and a fixed position is added at the end referring to the initial along-track distance of the constraint's domain of application, d1. In the third—optional—context, new actions are added before the fixed position at the end of the previous sequence.

Figure 22:
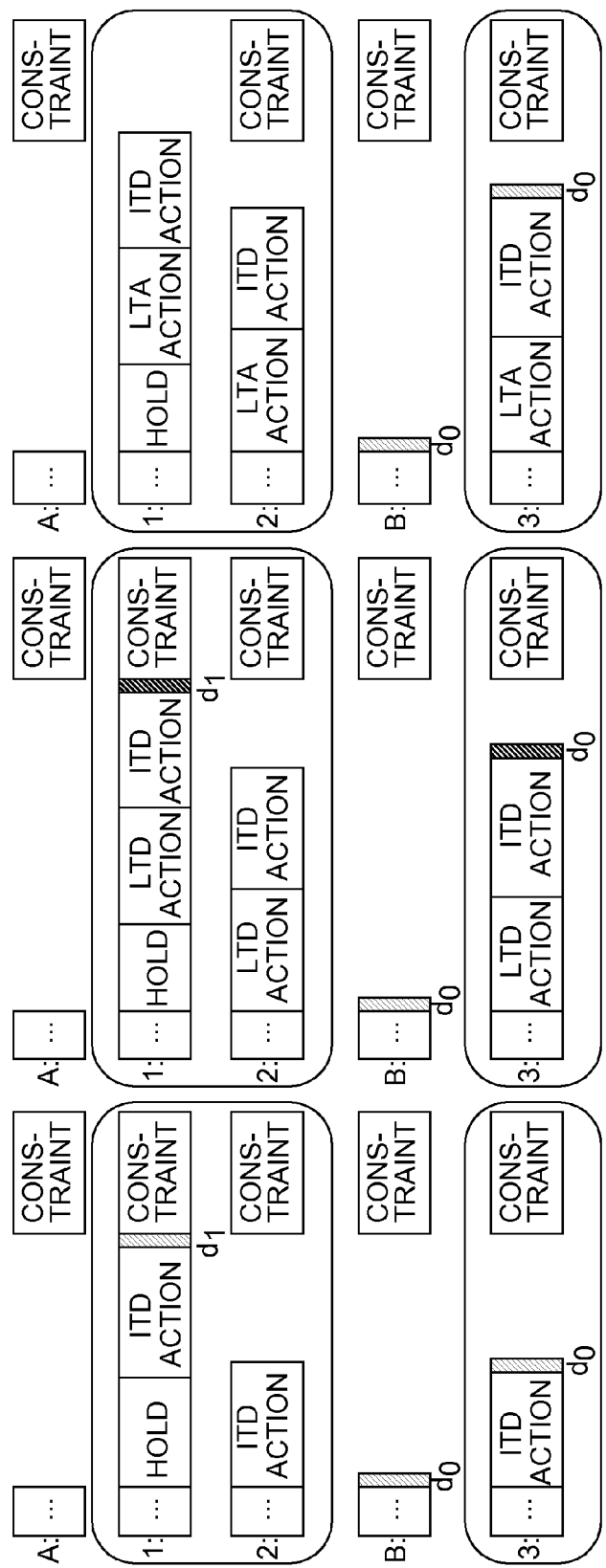
FIG. 22 shows examples of descent action-sequences.

FIG. 22 shows the action sequences generated in each case. Each column shows each of the three possible cases: a) no velocity action is needed; b) a deceleration (LTD) is needed, and; c) an acceleration (LTA) is needed.

Mach-CAS Descent Micro-Strategies

The Mach-CAS descent micro-strategy addresses an altitude and a velocity constraint by performing two ITD actions: the first ITD action holds Mach speed, and the second one holds CAS. This micro-strategy only generates new contexts if the following conditions are met:

The expected velocity of the aircraft is given in Mach.

There is at least one unresolved altitude constraint and one unresolved velocity constraint left that overlap along the trajectory.

The target velocity of the aircraft is given in CAS.

The altitude of the altitude constraint affects the velocity constraint.

The minimum target altitude of that constraint is lower than the maximum expected altitude. That is, the constraint may need the aircraft to decrease altitude.

If previous conditions are met, and the crossover altitude computed with the expected and the target speed is between the expected and the target altitude, two contexts are added to the output set. In the first context, a hold element is added before the two ITD actions, and a fixed position is added at the end referring to the initial along-track distance of the constraint's domain of application, d1. In the second one, two ITD actions are added at the end of the previous sequence.

If conditions are met and the context contains any descent-velocity constraint, the crossover altitude is computed again but replacing the target speed with the speed of the descent-velocity constraint. If that altitude calculated is between the expected and the target altitude, two contexts are added to the output set. In the first context, a hold element is added before the two ITD actions and the corresponding velocity action (LTA or LTD), and a fixed position is added at the end referring to the initial along-track distance of the constraint's domain of application, d1. The velocity action depends on which action should be taken to comply with the original target speed of the velocity constraint. In the second context, two ITD actions followed by a velocity action (LTA or LTD) are added to the end of the previous sequence.

Figure 23:
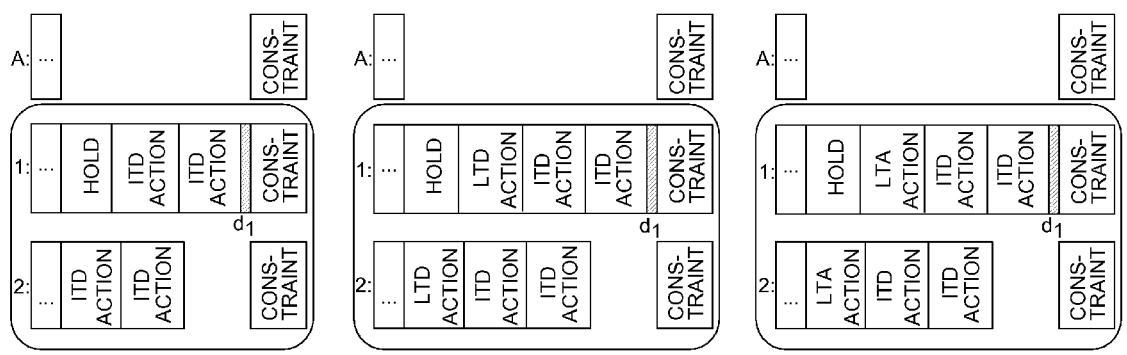
FIG. 23 shows examples of Mach-CAS descent action-sequences.

FIG. 23: shows the action sequences generated in each case. Each column shows each of the three possible cases: a) no velocity action is needed; b) an acceleration (LTA) is needed, and; c) a deceleration (LTD) is needed.

Configuration Profile Algorithm:

The configuration profile algorithm is responsible for generating the intent composites (IC) corresponding to the configuration profile. This algorithm must be understood as a subsystem inside the vertical profile algorithm.

The input of configuration profile algorithm consists of each expanded context created in the context expansion of previous algorithm. The output of the algorithm is a set of expanded contexts that must be added to the database of contexts.

The resulting expanded context includes in addition a sequence of configuration actions to control the performance of the aircraft. That sequence includes the initial flaps position, landing gear and speed brakes of the aircraft.

As has been explained, for each element in the vertical action-sequence, an element in the configuration sequence must be present, so that the end of those configuration elements is the one delimited by the vertical action.

Configuration Action Sequences

The configuration sequence is a key element of the context data structure. Basically, a configuration sequence is a list of two different types of elements:

One of these elements is the Action element. An action in the configuration sequence represents a change in the flaps position, landing gear or speed brakes of the aircraft. Landing gear extension or flaps retraction are examples of those actions.

And the second element of the configuration sequence is the Hold element (also called no-action element). This element represents a steady state that doesn't cause any change on the flaps, landing gear and speed brakes of the aircraft.

These two elements can be combined to create complex sequence of configuration actions. A configuration action can be translated into ICDL composite defining the configuration profile.

Figure 24:
FIG. 24 shows an exemplary configuration action-sequence, intended to comply with the Flight constraints given as an input to the process in FIDL description language, and corresponding with the vertical action-sequence shown in FIG. 2.

For example, using the example related to FIG. 2, a corresponding configuration sequence to that sequence could be the one depicted in FIG. 24.

This example could be translated to an IC that commands the aircraft to retract landing gear and hold flaps and speed brakes while it is doing the altitude action of the vertical profile, and once landing gear is retracted, hold the three parameters for next vertical actions.

Actions in the configuration sequence may describe many different types of maneuvers: it can be a retraction of aircraft's landing gear, an extension of flaps to perform a descent, or an extension of speed brakes to follow a certain descend path. Retraction action has between one and three targets, depending on how many aircraft's parameters (high lift, landing gear and speed brakes) is in charge of retracting.

Extension action is similar to retraction action, but is in charge of extension. As occurs in ICDL, the target high lift, landing gear or speed brakes may consist of an interval of values. These values allow computing an estimated altitude or speed at the end of the sequence.

Sequences of configuration actions must conform to the next pair of rules:
1) Configuration sequences consist of a list of configurations actions and hold elements.
2) Two action sequences are equal if and only if they have the same elements and in the same order.

Configuration actions are maneuvers that should be performed one after the other. Hold elements can be seen as the elements filling the gaps between actions where there is nothing else to do.

Action Expansion

Once it has been determined whether a context has new actions and they are of a different type of fixed distances, this process may start, as shown in FIG. 7. This action is sent to each micro-strategy implemented, which are in charge of generating new contexts. These new contexts may be a copy from the original one, but with a new configuration action in the configuration sequence created according to the vertical action and the proper heuristic of each configuration micro-strategy. After that, the original context is checked, whether new actions have not been treated yet, and if so, another iteration through the configuration micro-strategies may be done with the new contexts. This loop will finish when none new action remains in the original context.

Configuration Micro-Strategies:

This section describes the micro-strategies included in the current implementation of the configuration profile algorithm. The input of a micro-strategy may be a sequence element and a context, and the output may be a set containing zero or more contexts. Output contexts are similar to the input context but with an additional configuration element in the configuration sequence.

Some new terms are used in the description of the micro-strategies, whose definition can be found below:

The initial high lift is the estimated final flaps position at the end of the configuration sequence in the input context. The initial high lift has a minimum, maximum and default value (which must be between the other two).

The initial landing gear is the estimated final landing gear position at the end of the configuration sequence in the input context. The initial high lift has a minimum, maximum and default value (which must be between the other two).

The initial speed brake is the estimated final speed brakes position at the end of the configuration sequence in the input context. The initial high lift has a minimum, maximum and default value (which must be between the other two).

The final high lift is the desired final flaps position at the end of the new configuration action to be added to the output context. It has a minimum, maximum and default value (which must be between the other two).

The final landing gear is the desired landing gear position at the end of the new configuration action to be added to the output context. It has a minimum, maximum and default value (which must be between the other two).

The final speed brake is the desired final flaps position at the end of the new configuration action to be added to the output context. It has a minimum, maximum and default value (which must be between the other two).

Do Nothing Micro-Strategy

This micro-strategy always generates a new context independently from which vertical action is been expanded. The only thing to take into account is whether other configuration action should be addressed prior to this action, which can be summarized in next cases:

The action which is been expanded is an acceleration. For example, if flaps position is equal 10, an action in charge of retracting them should have more priority.

The action which is been expanded is an ascent. For example, if landing gear is extended, an action in charge of retracting it should have more priority.

Initial high lift, landing gear or speed brakes is greater than zero.

This micro-strategy is made with the idea that the best performance for the aircraft is keeping retracted flaps, landing gear and speed brakes the most possible time, and thereby, to hold this configuration always except previous cases.

Refraction Micro-Strategy

The retraction micro-strategy addresses all the situations where a retraction of high lift, landing gear or speed brakes should be done.

This micro-strategy only generates new contexts if the following conditions are met:

High lifts or landing gear are extended.

The action which is been expanded is an acceleration or ascent.

If conditions are met, and high lift is expanded, a table may be built based on the Aircraft Performance Model (APM), the expected speed and the initial high lift. This table may contain a relationship between the flaps position and the maximum speed associated to that position of high lift. Once that table is built, all possible high lift retraction solutions are built, from the best one to the worst one. This criterion may be based on the bigger the retraction the better the solution.

If conditions are met, and landing gear is deployed, it may be retracted as soon as possible only if aircraft is going up. Otherwise this parameter may indicate to hold landing gear.

The last step is to generate the new contexts with the suitable priorities, and the new retraction action in the configuration sequence. That action through three parameters may have an impact on the three aircraft's configuration profiles. And those contexts are generated as a combination of all possible high lift retraction solutions and the landing gear retraction solution.

Extension Micro-Strategies

The extension micro-strategy addresses those situations where an extension of high lifts, landing gear, or speed brakes could be necessary.

This micro-strategy only generates new contexts if the following conditions are met:

It is possible to extend high lift or deploy landing gear.

The action which is been expanded is a deceleration or a descent.

If conditions are met, and high lift could be extended, a table may be built based on the Aircraft Performance Model, the expected speed and the initial high lift. This table contains a relationship between the flaps position and the maximum speed associated to that position of high lift. Once that table is built, all possible high lift retraction solutions are built, from the best one to the worst one. This criterion may be based on the lower the extension the better the solution.

If conditions are met and landing gear is retracted, it will be extended as soon as possible only if aircraft is going down and the position of flaps is the maximum, which indicates the landing phase is imminent. Otherwise this parameter will indicate to hold landing gear.

The last step is to generate the new contexts with the suitable priorities, and the new retraction action in the configuration sequence. That action through three parameters will have an impact on the three aircraft's configuration profiles. And those contexts are generated as a combination of all possible high lift retraction solutions and the landing gear retraction solution.

FIGS. 8 and 9 summarize the steps of these processes.

The following is an explanation of the example application depicted in FIGS. 10 to 16.

The example application described in FIGS. 10 to 16, shows how three Flight Constraints, namely C1, C2 and C3, are tackled by the method of the invention (making use of an Intent Generation Process) in order to univocally determine a set of maneuvers that will lead the aircraft to describe a trajectory that fully conforms with the flight constraints and user preferences/optimization criteria.

Constraint C1 is an altitude-type Flight constraint, referring to domain of application DoA1 (delimited by along-track distances d1 and d2), which expresses that the aircraft should hold at an altitude below 3000 ft, when flying across domain of application DoA1.

Constraint C2 is a speed-type Flight constraint, also referring to domain of application DoA1, which expresses that the aircraft should hold a speed below 250 kt, when flying across domain of application DoA1.

Constraint C3 is an altitude-type Flight constraint, referring to domain of application DoA2 (delimited by along-track distances d3 and d4), which expresses that the aircraft should hold at an altitude equal to 1000 ft, when flying across domain of application DoA2.

In the example application, the initial conditions of the aircraft are defined by an initial altitude of Hp=5000 ft, and an initial CAS speed of VCAS=3000 kt.

According to an embodiment of the method of the invention, the initial context is generated as follows:

Altitude constraints: unresolved (C1, C3); resolved (none).

Velocity constraints: unresolved (C2); resolved (none).

Action sequence: empty.

Partial trajectory: empty.

Fitness value: 0.

Initial context is the leaf or node 0 of the decision tree.

Figures 11, 12:
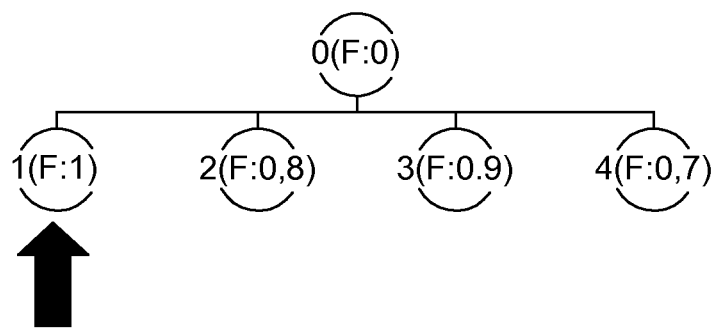
FIG. 11 shows, for the same example application of FIG. 9, how descent micro-strategies and deceleration micro-strategies differently address flight constraints C1 and C2 of the initial flight context.
FIG. 12 shows, for the same example application, the creation of the first four leaves of the decision tree, each leaf corresponding to a partial piloting strategy whose content is an expanded context derived from the initial context.

FIG. 11 shows how the first four piloting strategies (corresponding to nodes 1, 2, 3 and 4 of the decision tree, as shown in FIG. 12) are built up.

Leaves or nodes 1 and 2 correspond to piloting strategies generated by a descend micro-strategy which addresses Flight constraint C1 of the example application. This constraint is addressed in two different ways, thus generating two different leaves (allocated two different fitness values).

Leaves 3 and 4 of the decision tree correspond to piloting strategies generated by a decelerate micro-strategy which addresses Flight constraint C2 of the example application. This constraint is also addressed in two different ways, thus generating two different leaves (allocated two different fitness values).

In each step of the recursive process, the fitness value assigned to each leaf of the decision tree is the fitness value of its "parent context" plus a positive value.

As shown in FIG. 12, there are four different tree leaves, corresponding to four different (yet partial) piloting strategies, allocated four different fitness values.

The piloting strategy allocated the greatest fitness value (in this case, node 1 of the decision tree) is chosen and the corresponding context is further expanded in a new recursive step, making use of other micro-strategies which tend to address the yet unresolved constraints (in this case, constraints C2 and C3).

Figure 13:
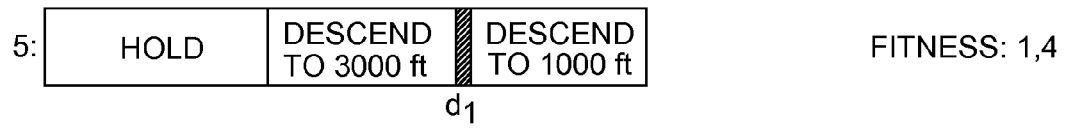
FIG. 13 shows, for the same example application, how descent micro-strategies and deceleration micro-strategies differently address flight constraints C2 and C3 of the expanded flight context chosen in the first step of the recursive process in charge of building-up the decision tree.
Figure 13:
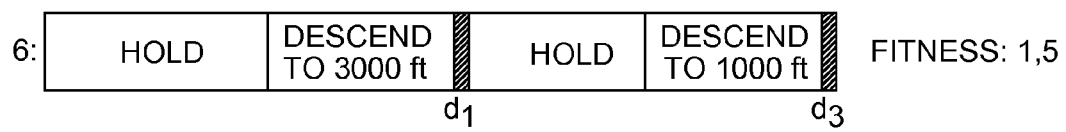
Figure 13:
Figure 14:
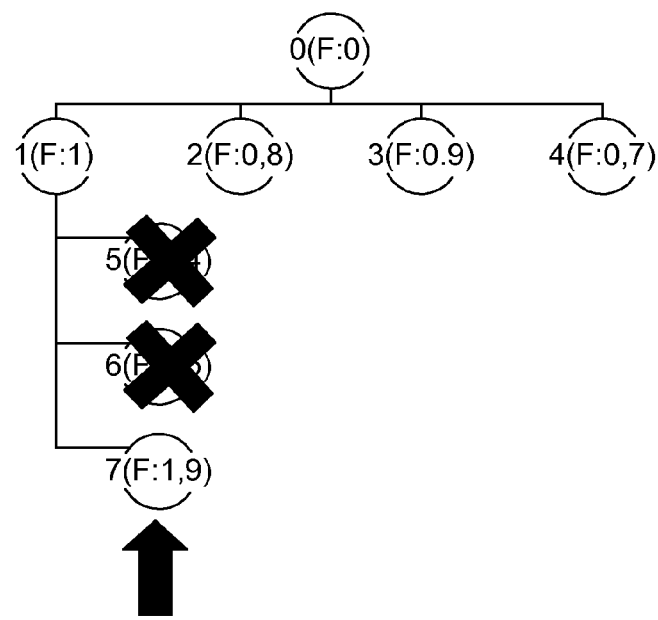
FIG. 14 shows, for the same example application, the creation of the fifth, sixth and seventh leaves of the decision tree, each leaf corresponding to a partial piloting strategy whose content is an expanded context derived from the expanded context chosen in the first step of the recursive process.

FIG. 13 shows how the next three piloting strategies (corresponding to nodes 5, 6 and 7 of the decision tree, as shown in FIG. 14) are built up.

Leaves or nodes 5 and 6 correspond to piloting strategies generated by a descend micro-strategy which addresses Flight constraint C3 of the example application. This constraint is addressed in two different ways, thus generating two different leaves (allocated two different fitness values).

Leaf 7 of the decision tree corresponds to a piloting strategy generated by a decelerate micro-strategy which addresses Flight constraint C2 of the example application. This leaf is allocated another different fitness value.

As shown in FIG. 14, there are three different new tree leaves, corresponding to three different (yet partial) piloting strategies, allocated three different fitness values.

The piloting strategy allocated the greatest fitness value (in this case, node 7 of the decision tree) is chosen and the corresponding context is further expanded in a new recursive step, making use of other micro-strategies which tend to address the yet unresolved constraint (in this case, constraint C3).

In the previous step, contexts 5 and 6 are discarded because they have not addressed Flight constraint C2 within its corresponding Domain of Application (DoA1). Thus, they are allocated a smaller fitness value than that of the context 7.

Figures 15, 16:
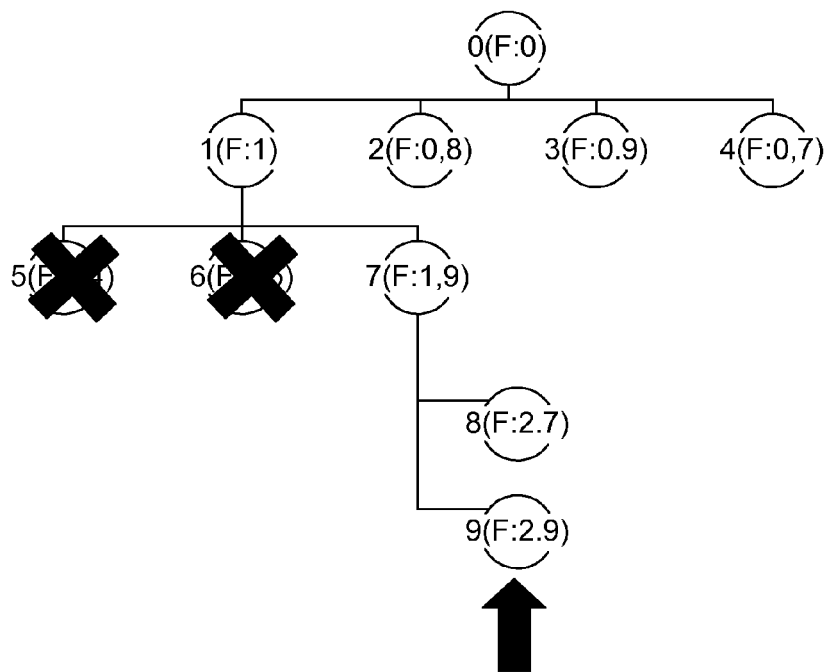
FIG. 15 shows, for the same example application, how descent micro-strategies differently address flight constraint C3 of the expanded flight context chosen in the second step of the recursive process in charge of building-up the decision tree.
FIG. 16 shows, for the same example application, the creation of the eighth and ninth leaves of the decision tree, each leaf corresponding to a partial piloting strategy whose content is an expanded context derived from the expanded context chosen in the second step of the recursive process.

FIG. 15 shows how the next two piloting strategies (corresponding to nodes 8 and 9 of the decision tree, as shown in FIG. 16) are built up.

Leaves or nodes 8 and 9 correspond to piloting strategies generated by a descend micro-strategy which addresses Flight constraint C3 of the example application. This constraint is addressed in two different ways, thus generating two different leaves (allocated two different fitness values).

As shown in FIG. 16, there are two different new tree leaves, corresponding to two different (complete) piloting strategies, allocated two different fitness values.

The piloting strategy allocated the greatest fitness value (in this case, node 9 of the decision tree) is chosen as the Flight context providing a solution to all the Flight constraints and having been allocated the greatest fitness value.

Node 9 cannot be expanded any more, as it already addresses all the constraints; it is then a candidate trajectory.

Further, the partial trajectory is computed and, if it is found feasible, a hold action is appended at the end of the action sequence (until the end of the flight), and the resulting sequence of actions is chosen.

Thus, in the example application, leaf 9 of the decision tree finally provides a suitable piloting strategy fulfilling all the requirements of the Flight.

The method of the present disclosure can be generally applied to every Process (Horizontal Profile Generation Process, Vertical Profile Generation Process and Configuration Profile Generation Process) forming part of the Intent Generation Process, which is the core of the Trajectory Prediction/Generation Process, when making use of the known Description Languages for aircraft Intents (FIDL, ICDL, AIDL).

Although various embodiments have been shown and described, the present disclosure is not so limited and will be understood to include all such modifications and variations are would be apparent to one skilled in the art.

What is claimed is:

1. A method comprising:
   generating a set of flight contexts including at least an initial flight context, wherein each flight context of the set of flight contexts includes a fitness value;
   repeatedly performing operations comprising:
      selecting a flight context that has a highest fitness value from the set of flight contexts;
      resolving at least one flight constraint selected from a set of unresolved flight constraints of the selected flight context to obtain at least one expanded flight context;
      allocating a new fitness value to the at least one expanded flight context; and
      adding the at least one expanded flight context to the set of flight contexts;
   after repeatedly performing the operations, selecting, from the set of flight contexts, the flight context that has the highest fitness value as a piloting strategy for flying an aircraft; and
   automatically piloting the aircraft according to the piloting strategy.

2. The method of claim 1, wherein each flight context of the set of flight contexts further includes a set of resolved flight constraints, the set of unresolved flight constraints, a sequence of actions to be performed by the aircraft, or a combination thereof.

3. The method of claim 2, wherein the set of resolved flight constraints includes a set of resolved altitude flight constraints, a set of resolved speed flight constraints, or both, and wherein the set of unresolved flight constraints includes a set of unresolved altitude flight constraints, a set of unresolved speed flight constraints, or both.

4. The method of claim 2, wherein the flight constraints are expressed in a flight intent description language (FIDL) comprising lexemes that univocally express a way of piloting the aircraft and univocally lead to a determinate aircraft trajectory when all configurable parameters involved in the FIDL lexemes are determined.

5. The method of claim 4, wherein the configurable parameters include:
   a range of numerical values of certain air vehicle state variables;
   a set of discrete values for defining the reference for the numerical value of the aircraft state variables; and
   a set of discrete values for defining different air vehicle settings.

6. The method of claim 2, wherein each action of the sequence of actions is expressed in an intent composite description language (ICDL) comprising lexemes or intent composites that univocally express a way of piloting the aircraft and univocally lead to a determinate aircraft trajectory when all configurable parameters involved in the ICDL lexemes are determined.

7. The method of claim 6, further comprising translating the sequence of actions from the ICDL into an aircraft intent description language (AIDL) that is a low level description language that univocally defines a precise way of commanding configurable parameters of the aircraft, yielding to a determinate aircraft trajectory.

8. The method of claim 2, further comprising leaving at least one configurable parameter of at least one of the actions of the sequence of actions as undefined or expressed as a range of selectable values to enable tuning according to a user preference.

9. The method of claim 1, wherein resolving the at least one flight constraint includes:
selecting an action that addresses the at least one flight constraint;
adding the selected action to a sequence of actions to be performed by the aircraft;
removing the at least one flight constraint from the set of unresolved flight constraints; and
adding the at least one flight constraint to a set of resolved flight constraints of the selected flight context.

10. The method of claim 1, wherein the piloting strategy is selected from a subset of the set of flight contexts, wherein each flight context of the subset has an empty set of unresolved flight contexts.

11. The method of claim 1, wherein the operations further comprise computing a partial trajectory corresponding to at least one action of a sequence of actions associated with the selected flight context.

12. The method of claim 11, wherein an amount of time devoted to resolving the at least one flight constraint and to computing the partial trajectory is configurable to enable compromise between computing time and optimality of the piloting strategy.

13. The method of claim 11, wherein the piloting strategy is selected from a subset of the set of flight contexts, wherein for each flight context of the subset, the partial trajectory corresponds to each action of the sequence of actions and is feasible.

14. The method of claim 13, wherein the partial trajectory is feasible when the partial trajectory is flyable and the partial trajectory meets all the resolved flight constraints, wherein the partial trajectory is flyable if it is compatible with an aircraft performance model of the aircraft.

15. The method of claim 1, wherein the new fitness value is:
proportional to a number of resolved flight constraints of the at least one expanded flight context,
proportional to an inverse of the number of resolved flight constraints of the at least one expanded flight context,
proportional to the number of unresolved flight constraints of the at least one expanded flight context,
proportional to the number of unresolved flight constraints of the at least one expanded flight context,
equal to the sum of an estimated cost of a computed partial trajectory corresponding to the at least one expanded flight context and an estimated cost of an estimated remaining trajectory,
or any combination thereof.

16. A method comprising:
generating an initial flight context;
adding the initial flight context to a set of flight contexts stored at a context database;
selecting a flight context that has a highest fitness value from the set of flight contexts, the selected flight context including a set of unresolved flight constraints, a set of resolved flight constraints, and a sequence of actions;
computing a partial trajectory for all the actions of the sequence of actions when the partial trajectory can be computed;
determining whether the partial trajectory is feasible when the partial trajectory is computed;
determining whether the set of unresolved flight constraints is empty when the partial trajectory is feasible;
yielding a piloting strategy corresponding to the selected flight context when the set of unresolved flight constraints is empty, otherwise:
resolving at least one flight constraint of the set of unresolved flight constraints of the selected flight context to form at least one expanded flight context;
adding the one or more expanded flight contexts to the set of flight contexts; and
selecting again the flight context that has the highest fitness value from the set of flight contexts; and
automatically piloting an aircraft unmanned according to the piloting strategy.

17. The method of claim 16 further comprising:
when the partial trajectory cannot be computed:
determining whether the set of unresolved flight constraints is empty.

18. The method of claim 16 further comprising:
when the partial trajectory is not feasible:
discarding the selected flight context from the set of flight contexts; and
yielding no solution when the set of flight contexts is empty, otherwise, selecting again the flight context that has the highest fitness value from the set of flight contexts.

19. A method comprising:
generating an initial flight context that includes a set of unresolved flight constraints;
generating a decision tree based on the initial flight context, the decision tree including a plurality of flight contexts corresponding to leaves of the decision tree;
expanding the decision tree according to a greedy best-first strategy that selects a flight context of the decision tree for expansion based on a fitness value assigned to the flight context; and
selecting, as a piloting strategy, a flight context of the decision tree that includes a sequence of actions to resolve each of the unresolved flight constraints; and
automatically piloting an aircraft according to the piloting strategy.

20. The method of claim 19, further comprising computing a partial trajectory corresponding to the selected flight context, wherein the fitness value is based on at least one measure of the partial trajectory, the measure including consumed fuel, elapsed time, average velocity, or a combination thereof.

* * * * *